United States Patent
Yoshida

(10) Patent No.: US 7,098,937 B2
(45) Date of Patent: Aug. 29, 2006

(54) MULTI-BEAM SCANNING OPTICAL SYSTEM, IMAGE FORMING APPARATUS, AND COLOR IMAGE FORMING APPARATUS

(75) Inventor: Hiroki Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 10/810,592

(22) Filed: Mar. 29, 2004

(65) Prior Publication Data

US 2004/0196356 A1 Oct. 7, 2004

(30) Foreign Application Priority Data

Apr. 4, 2003 (JP) ............................. 2003-101473

(51) Int. Cl.
*B41J 2/47* (2006.01)
*B41J 2/435* (2006.01)
(52) U.S. Cl. .................. 347/235; 347/225; 347/238; 347/250; 347/241; 347/234
(58) Field of Classification Search ................ 347/235, 347/250, 238, 225, 241, 115, 237, 118, 130, 347/131, 134; 359/204, 212, 197; 358/296–304; 399/177, 191
See application file for complete search history.

(56) References Cited

U.S. PATENT DOCUMENTS

| | | | | |
|---|---|---|---|---|
| 5,926,202 A | * | 7/1999 | Hattori | 347/237 |
| 6,115,165 A | * | 9/2000 | Tada | 359/204 |
| 6,317,244 B1 | * | 11/2001 | Ishibe | 359/204 |
| 6,362,470 B1 | | 3/2002 | Yoshida et al. | 250/235 |
| 6,476,955 B1 | | 11/2002 | Yoshida | 359/204 |
| 6,646,668 B1 | * | 11/2003 | Tanimoto et al. | 347/234 |
| 6,667,820 B1 | | 12/2003 | Yoshida | 359/204 |
| 6,667,822 B1 | | 12/2003 | Yoshida | 359/207 |
| 2002/0057327 A1 | | 5/2002 | Yoshida | 347/233 |
| 2002/0154208 A1 | | 10/2002 | Yoshida | 347/241 |
| 2003/0001944 A1 | * | 1/2003 | Yoshida et al. | 347/241 |
| 2003/0063360 A1 | * | 4/2003 | Ishihara | 359/212 |

* cited by examiner

FOREIGN PATENT DOCUMENTS

JP 9-54263 2/1997

*Primary Examiner*—Lamson Nguyen
*Assistant Examiner*—Carlos Martinez
(74) *Attorney, Agent, or Firm*—Fitzpatrick, Cella, Harper & Scinto

(57) ABSTRACT

In a multi-beam scanning optical system, when at least three light fluxes emitted from a light source having at least three light-emitting points are deflected and reflected on a deflection unit and guided to a surface to be scanned by a scanning optical unit, at least three light fluxes are entered into a deflection surface of the deflection unit at irregular angles within a main-scanning section and entered into the surface to be scanned at an angle within a sub-scanning section, and provided that a variation in lengths of scanning lines which is caused when each of the at least three light fluxes is entered into the surface to be scanned at an angle within the sub-scanning section is represented as $\Delta Y1$, a variation in lengths of scanning lines which is caused when each of the at least three light fluxes is allowed to enter as a non-parallel light flux to the deflection surface within the main-scanning section is represented as $\Delta Y2$, and a variation in lengths of scanning lines which is caused from a difference of wavelength between at least two of the at least three light fluxes is represented as $\Delta Y3$, values of $\Delta Y1$, $\Delta Y2$, and $\Delta Y3$ are set so as to satisfy $|\Delta Y1+\Delta Y2+\Delta Y3|<|\Delta Y1|$.

9 Claims, 16 Drawing Sheets

MULTI-BEAM SCANNING OPTICAL SYSTEM, IMAGE FORMING APPARATUS, AND COLOR IMAGE FORMING APPARATUS

BACKGROUND OF THE INVENTION

1. Field of the Invention

The present invention relates to a multi-beam scanning optical system. In particular, the present invention relates to a multi-beam scanning optical system suitable to an image forming apparatus such as a laser beam printer, a digital copying machine, or a multifunction printer, which employs, for example, an electrophotographic process, in which a plurality of light fluxes (laser light) emitted from a light source unit are deflected and reflected on a polygon mirror serving as an optical deflector and then a surface to be scanned is scanned with the light flux through a scanning optical unit to record image information.

2. Related Background Art

Up to now, in a scanning optical system used for an image forming apparatus, a light flux emitted from a light source (light-emitting region) serving as a light source unit is guided to a deflection unit through an incident optical unit including a collimator lens and a cylindrical lens (cylinder lens). The light flux which is deflected and reflected on the deflection unit is imaged in a spot shape onto a surface to be scanned through a scanning optical unit, and optical scanning using the light flux is performed.

In recent years, with improving the performance and the function of the image forming apparatus, a need for high speed scanning of the scanning optical system has been increased. For meeting such a need for high speed scanning, one solution is to use a plurality of light sources. For example, a scanning optical system has been proposed, in which a multi-beam laser chip, which emits a plurality of light fluxes aligned on a straight line from a single chip, is used as a light source (see, for example, Japanese Patent Application No. H09-054263).

Now, in the case where the surface to be scanned is flat or cylindrical, when there is an instant at which a light flux is perpendicularly entered into the surface to be scanned, return light to a light source is generated. In the case where such a phenomenon is caused, a streak or the like is caused on a printed image in some cases. To prevent the phenomenon, as shown in FIGS. 11A and 11B, the light flux is generally allowed to enter at an angle relative to a sub-scanning direction. Note that, in FIGS. 11A and 11B, reference numeral 98 denotes a housing member that houses the light source, an optical deflector, and the like and reference numeral 99 denotes a photosensitive belt or a photosensitive drum, which serves as an image bearing member.

However, when a plurality of scanning lines are drawn at the same time in the cases shown in FIGS. 11A and 11B, because an imaging position is deviated in the sub-scanning direction, the optical path lengths of respective light fluxes are different from one another as shown in FIGS. 12A and 12B. As a result, the lengths of the scanning lines are not equal to one another.

FIG. 12A is a schematic view showing a state in which four light fluxes are entered into the surface of the cylindrical photosensitive drum 99. In the case shown in FIG. 12A, an optical path length of a light flux located on the uppermost side in the figure becomes longer than an optical path length of a light flux located on the lowermost side by a distance D. At this time, with respect to a region other than a central region of the photosensitive drum 99, the respective light fluxes are entered into the surface of the photosensitive drum 99 at an angle relative to a main-scanning direction. Therefore, the incident positions of the respective light fluxes are deviated in the main-scanning direction according to a difference among the optical path lengths.

FIG. 12B shows a relationship among the lengths of the scanning lines in such a state. A scanning line located on the right side in FIG. 12B indicates a scanning line drawn by the light flux located on the uppermost side in FIG. 12A. In addition, a scanning line located on the left side in FIG. 12B indicates a scanning line drawn by the light flux located on the lowermost side in FIG. 12A. As shown in FIG. 12B, a difference between a length of the scanning line drawn by the light flux having the longest optical path length and a length of the scanning line drawn by the light flux having the shortest optical path length corresponds to a distance J on each side. In the case where such a phenomenon is neglected, a printing quality deteriorates on both sides of a printed image.

SUMMARY OF THE INVENTION

An object of the present invention is to provide a multi-beam scanning optical system that reduces a variation in scanning line lengths, which is caused at a time when three or more light fluxes are entered into a surface to be scanned at an angle within a sub-scanning section, so that high quality printing can be realized at high speed.

According to an aspect of the present invention, a multi-beam scanning optical system includes: a light source having at least three light-emitting points; deflection means for deflecting at least three light fluxes emitted from the at least three light-emitting points to a surface to be scanned; and scanning optical means for guiding the at least three light fluxes which are deflected and reflected on the deflection means onto the surface to be scanned, each of the at least three light fluxes being entered into the surface to be scanned at an angle within a sub-scanning section, and in the multi-beam scanning optical system, provided that a variation in lengths of scanning lines which is caused when each of the at least three light fluxes is entered into the surface to be scanned at an angle within the sub-scanning section is represented as $\Delta Y1$, a variation in lengths of scanning lines which is caused when each of the at least three light fluxes is allowed to enter as a non-parallel light flux to a deflection surface of the deflection means within a main-scanning section is represented as $\Delta Y2$, and a variation in lengths of scanning lines which is caused from a difference of wavelength between at least two of the at least three light fluxes is represented as $\Delta Y3$, values of $\Delta Y1$, $\Delta Y2$, and $\Delta Y3$ are set so as to satisfy $|\Delta Y1 + \Delta Y2 + \Delta Y3| < |\Delta Y1|$.

In further another aspect of the multi-beam scanning optical system, in the case where an optical path length of a light flux from a light-emitting point nearest an optical axis of the scanning optical means to the surface to be scanned is longer than optical paths of light fluxes from other light-emitting points to the surface to be scanned, the light fluxes which are deflected and reflected on the deflection means are converted into convergent light fluxes, and in the case where the optical path length of the light flux from the light-emitting point nearest the optical axis of the scanning optical means to the surface to be scanned is shorter than the optical paths of the light fluxes from the other light-emitting points to the surface to be scanned, the light fluxes which are deflected and reflected on the deflection means are converted into divergent light fluxes.

In further another aspect of the multi-beam scanning optical system, the light source includes a plurality of light source units, at least one of the plurality of light source units includes a plurality of light-emitting points, a variation in lengths of scanning lines on the surface to be scanned, which are formed by light fluxes from light-emitting points in the plurality of light source units is reduced by converting the light fluxes which are deflected and reflected on the deflection means into non-parallel light fluxes within the main-scanning section, and a variation in lengths of scanning lines on the surface to be scanned, which are formed by light fluxes from the plurality of light-emitting points in the at least one light source unit is reduced by making a difference of wavelength between the light fluxes from the light-emitting points.

In further another aspect of the multi-beam scanning optical system, the light source includes a plurality of light source units, at least one of the plurality of light source units includes a plurality of light-emitting points, a variation in lengths of scanning lines on the surface to be scanned, which are formed by light fluxes from light-emitting points in the plurality of light source units is reduced by making a difference of wavelength between the light fluxes from the light-emitting points in the light source units, and a variation in lengths of scanning lines on the surface to be scanned, which are formed by light fluxes from the plurality of light-emitting points in the at least one light source unit is reduced by converting the plurality of light fluxes which are deflected and reflected on the deflection means into non-parallel light fluxes within the main-scanning section.

In further another aspect of the multi-beam scanning optical system, the at least three light fluxes are entered into the deflection surface of the deflection means at irregular angles within the main-scanning section.

According to another aspect of the present invention, an image forming apparatus includes: the multi-beam scanning optical system; a photosensitive member which is located on the surface to be scanned; a developing unit that develops, as a toner image, an electrostatic latent image which is formed on the photosensitive member scanned with the light fluxes by the multi-beam scanning optical system; a transferring unit that transfers the developed toner image to a transfer material; and a fixing device that fixes the transferred toner image to the transfer material.

According to another aspect of the present invention, an image forming apparatus includes: the multi-beam scanning optical system; and a printer controller that converts code data inputted from an external device into an image signal and outputs the image signal to the multi-beam scanning optical system.

According to another aspect of the present invention, a color image forming apparatus includes: a plurality of multi-beam scanning optical systems, each of which is the multi-beam scanning optical system; and a plurality of image bearing members each located on a surface to be scanned of the multi-beam scanning optical systems, which form images of different colors.

In further another aspect of the color image forming apparatus, the apparatus further includes a printer controller that converts a color signal inputted from an external device into image data of different colors and outputs the image data to the respective multi-beam scanning optical systems.

Other features of the present invention will be apparent upon reading the following description in conjunction with the accompanying drawings.

BRIEF DESCRIPTION OF THE DRAWINGS

FIGS. 13A, 13B-1, 13B-2, 13C, 13D, and 13E are main part schematic views in a convergent system;

FIGS. 14A, 14B-1, 14B-2, 14C, 14D, and 14E are main part schematic views in a divergent system;

FIGS. 15A, 15B-1, 15B-2, 15C, 15D, and 15E are main part schematic views upon irregular incidence;

DESCRIPTION OF THE PREFERRED EMBODIMENTS

First, a principle for achieving an object of the present invention will be described.

Figure 11A:
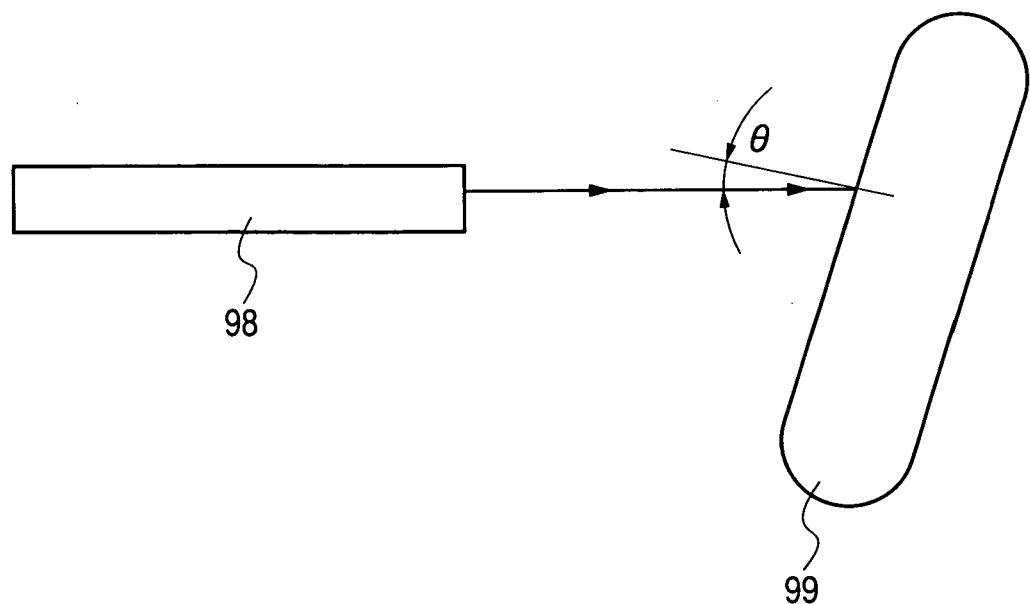
FIGS. 11A and 11B are main part schematic views each showing an angular relationship between a light flux and a surface to be scanned.
Figure 11B:
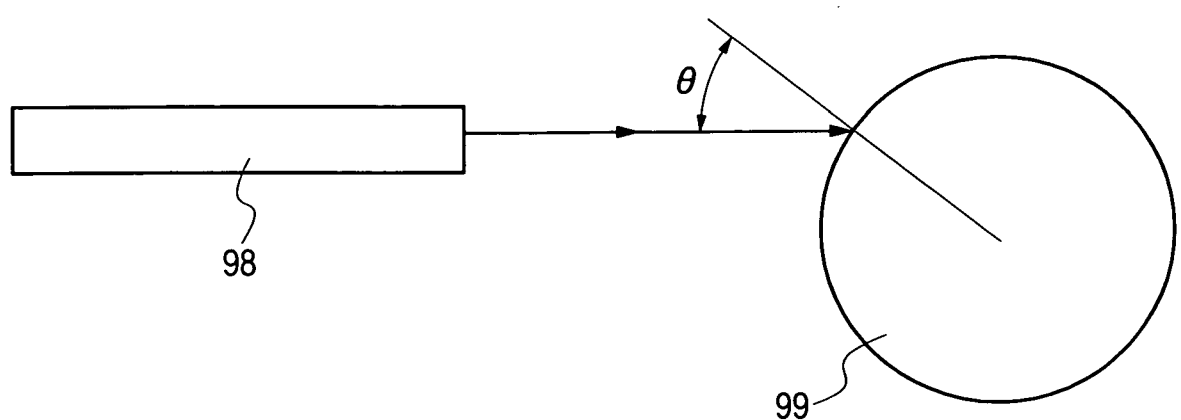

As described above, in the case where the surface to be scanned is flat, cylindrical, or whatever, when there is an instant at which a light flux is perpendicularly entered into the surface to be scanned, return light to a light source is generated. In the case where such a phenomenon is caused, a streak or the like is caused on a printed image in some case. To prevent the phenomenon, as shown in FIGS. 11A and 11B, the light flux is generally allowed to enter at an angle θ relative to a sub-scanning direction.

Figure 12A:
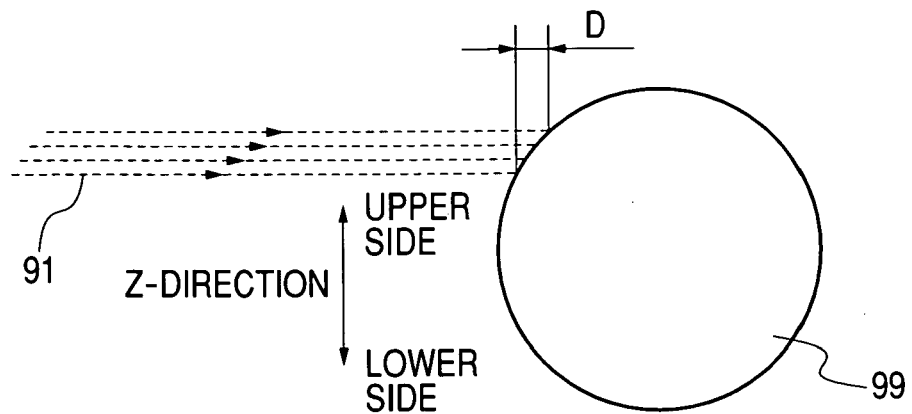
FIGS. 12A and 12B are main part schematic views showing a relationship between respective light fluxes and lengths of scanning lines.
Figure 12B:
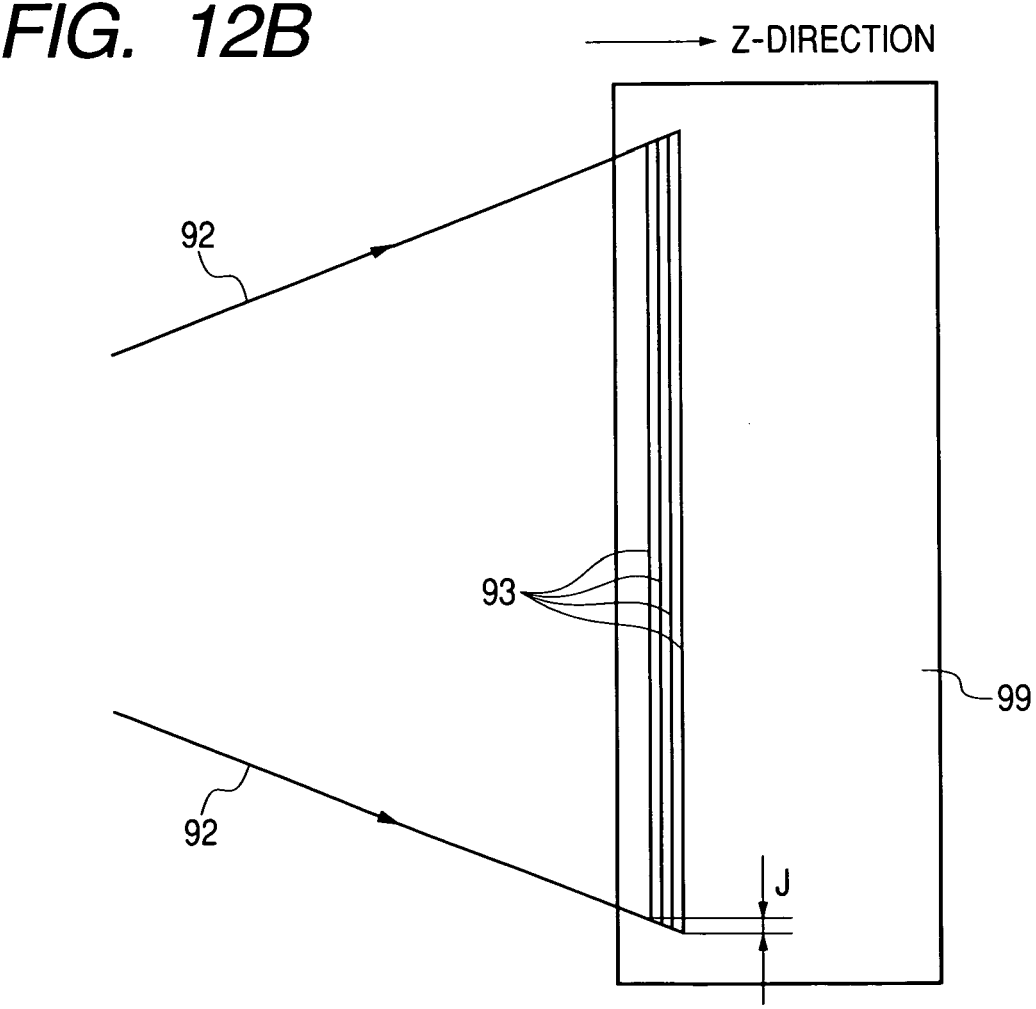

However, when a plurality of scanning lines are drawn at the same time, because an imaging position is deviated in a sub-scanning direction, the optical path lengths of respective light fluxes are different from one another as shown in FIGS. 12A and 12B. As a result, the lengths of the scanning lines are not equal to one another. FIG. 12A is a schematic view showing a state in which four light fluxes are entered into a cylindrical photosensitive drum 99, and a dashed line 91 denotes a main ray of each of the light fluxes.

In this specification, in the case where a length of a scanning line located on a plus side (upper side) in a Z-direction is longer than a length of a scanning line located on a minus side (lower side) in the Z-direction on the surface to be scanned, a sign of a variation Δ in scanning line lengths is set to a plus (+).

In the case shown in FIG. 12A, an optical path length of a light flux located on the uppermost side becomes longer than an optical path length of a light flux located on the lowermost side by a distance D. At this time, with respect to a region other than a central region of the photosensitive drum 99, the respective light fluxes are entered into the photosensitive drum 99 at an angle relative to a main-scanning direction. Therefore, the incident positions of the respective light fluxes are deviated in the main-scanning direction according to a difference among the optical path lengths.

FIG. 12B shows the case where a plus deviation in scanning line lengths is caused. Oblique solid lines 92 indicate optical paths of the respective light fluxes at both ends of an effective scanning region. Longitudinal solid lines 93 indicate scanning lines drawn by the respective light fluxes. A scanning line located on the right side in FIG. 12B indicates a scanning line drawn by the light flux located on the uppermost side in FIG. 12A. In addition, a scanning line located on the left side in FIG. 12B indicates a scanning line drawn by the light flux located on the lowermost side in FIG. 12A.

As shown in FIG. 12B, a difference between a length of the scanning line drawn by the light flux having a longest optical path length and a length of the scanning line drawn by the light flux having the shortest optical path length corresponds to a distance J on each side. In the case where such a phenomenon is neglected, a printing quality deteriorates on both sides of a printed image.

In order to reduce the above-mentioned phenomenon, the present invention proposes to use both the following methods or one of these if necessary:

(1) a method of converting a light flux which is entered into a scanning optical unit into a non-parallel light flux (convergent light flux or divergent light flux) with respect to a main-scanning section; and (2) a method of changing wavelengths of respective light fluxes.

First, "(1) the method of converting the light flux which is entered into the scanning optical unit into the non-parallel light flux with respect to the main-scanning section" will be described.

Assume that a plurality of light fluxes are entered into an optical deflector (rotating polygonal mirror) serving as a deflection unit at an angle within the main-scanning section. In such a state, in order to deflect and reflect the respective light fluxes in the same direction (in parallel), an angle of the optical deflector is somewhat shifted according to an incident angle of each of the light fluxes. In addition, the shift amount of angle of the optical deflector is kept constant without depending on a scanning image height. In this time, the rotational center of the generally used optical deflector does not exist on the deflection surface thereof, so that a position of a deflection point changes according to the rotation of the optical deflector. Assume that light fluxes emitted from respective light-emitting points (not shown) "a" and "b" are given by "A", "B", . . . , in ascending order of distance from an optical axis L of a scanning optical unit (not shown) as shown in, for example, FIG. 13A.

Figure 13A:
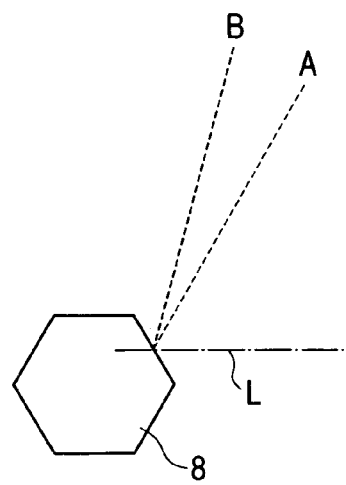

In FIG. 13A, a chain line L indicates the optical axis of the scanning optical unit and dashed lines A and B indicate main rays of the light fluxes emitted from the respective light-emitting points "a" and "b". When the respective light fluxes A and B are deflected on an optical deflector 8 and reflected in the same direction, as shown in both FIGS. 13B-1 and 13B-2, the angle of the optical deflector 8 in the case of the light flux "A" is somewhat different from that in the case of the light flux "B". Therefore, the position of the deflection point is changed.

Figure 1:
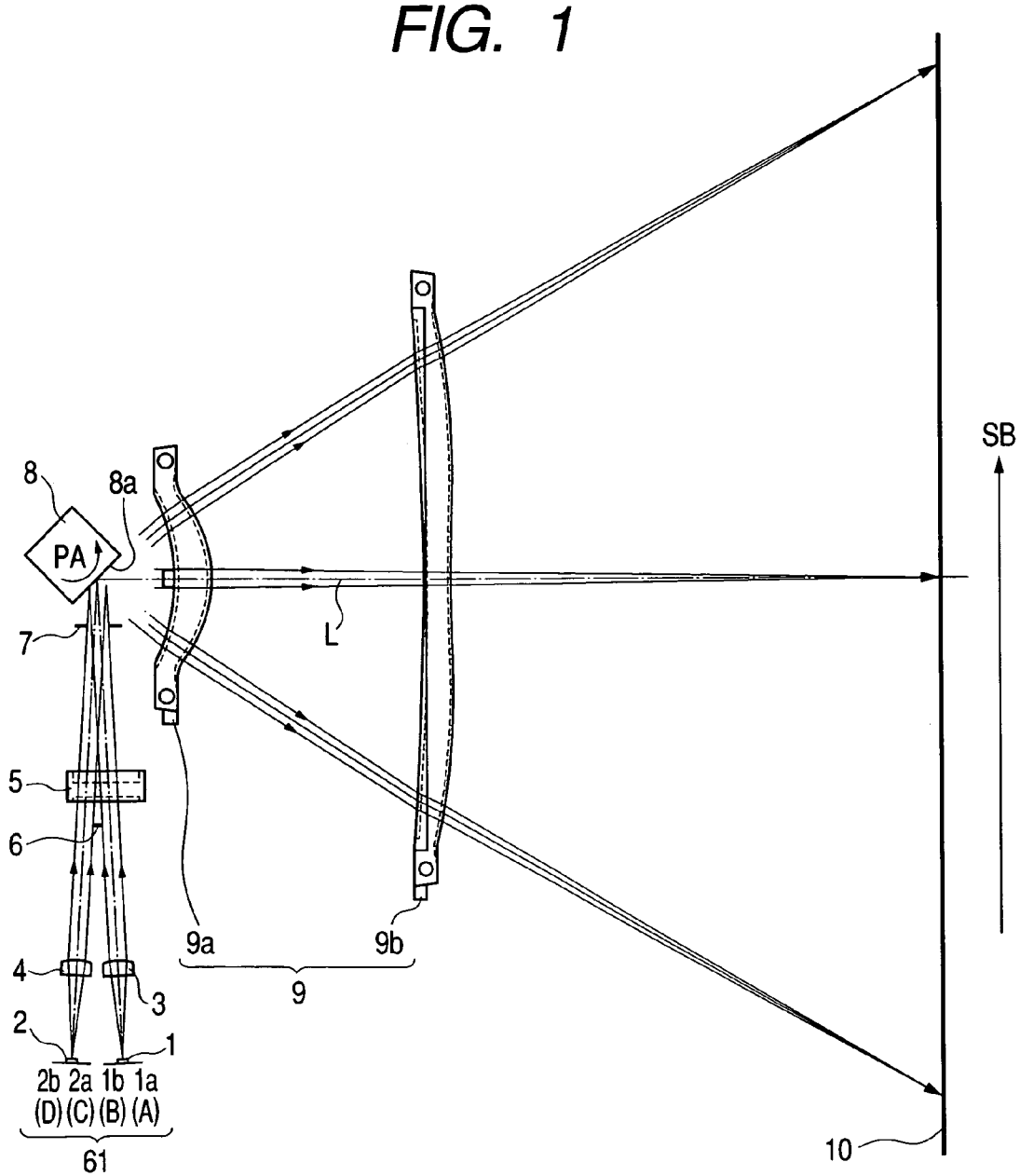
FIG. 1 is a main-scanning sectional view according to Embodiment 1 of the present invention.
Figure 2:
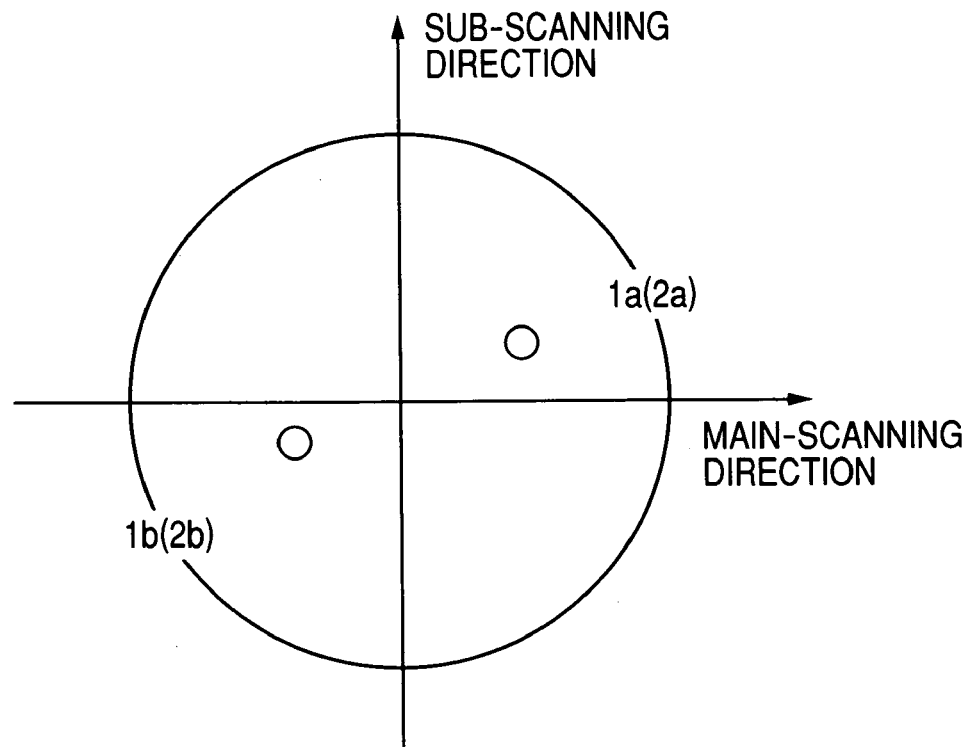
FIG. 2 is an explanatory view showing a positional relationship between light-emitting points according to Embodiment 1 of the present invention.
Figures 1, 13B:
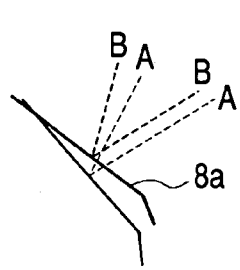
Figures 2, 13B:
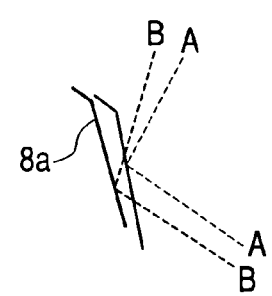

FIG. 13B-1 shows a state in which scanning is performed on the upper side of a scanning region and FIG. 13B-2 shows a state in which scanning is performed on the lower side of the scanning region. A solid line 8a indicates the deflection surface and the dashed lines A and B indicate the main rays of the respective light fluxes before and after the incidence of those. In this time, as is also apparent from FIGS. 13B-1 and 13B-2, the deflection point of the light flux "A" is located on the optical axis side as compared with that of the light flux "B". As a result, as shown in FIG. 13C, with respect to a positional relationship between the light fluxes entered into the scanning optical unit, the light flux "B" from the light-emitting point "b" passes through a location which is further apart from the optical axis L of the scanning optical unit as compared with the light flux "A" from the light-emitting point "a", regardless of whether scanning is performed on the upper side of the scanning region or the lower side thereof.

Figure 13C:
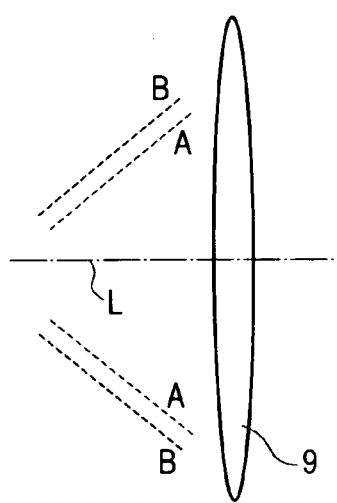
Figure 13D:
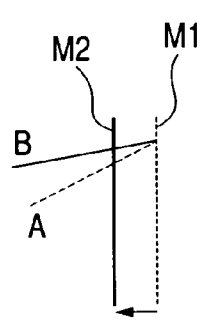
Figure 13E:
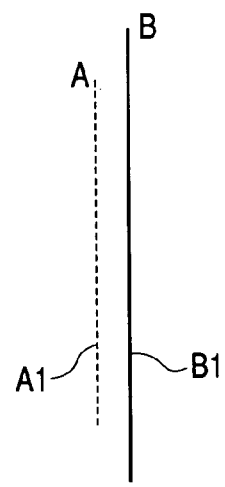

In FIG. 13C, a solid line 9 indicates the scanning optical unit, the dashed lines A and B indicate the main rays of the light fluxes emitted from the respective light-emitting points "a" and "b", and the chain line L indicates the optical axis of the scanning optical unit. In the case where the respective light fluxes "A" and "B" are parallel light fluxes, they are transmitted through the scanning optical unit 9 and refracted thereon (reflected thereon in the case of a mirror), so that the light fluxes having the parallel relationship are condensed at the same image height after the deflection and the reflection on the optical deflector 8. However, as shown in FIG. 13D, in the case where the respective light fluxes "A" and "B" are, for example, convergent light fluxes, an actual image plane is shifted to the optical deflector 8 side as compared with the image plane caused by the parallel light fluxes. Therefore, as shown in FIG. 13E, a scanning line A1 formed (drawn) by the light flux "A" becomes shorter than a scanning line B1 formed by the light flux "B".

In FIG. 13D, a heavy dashed line M1 indicates a position of the image plane at the time of incidence of parallel light fluxes. A heavy solid line M2 indicates a position of the image plane at the time of incidence of convergent light fluxes. A thin line "A" and a solid line "B" each indicate a main ray of each of the light fluxes. In FIG. 13E, a weak solid line A1 indicates a scanning line formed by the light flux "A" and a strong solid line B1 indicates a scanning line formed by the light flux "B".

Figure 14A:
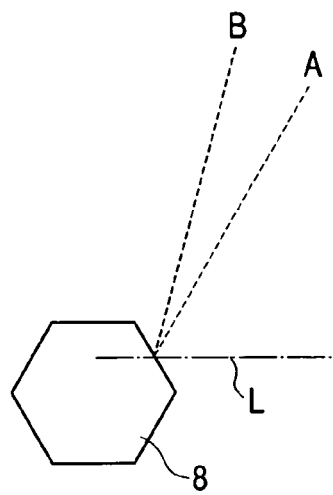
Figures 1, 14B:
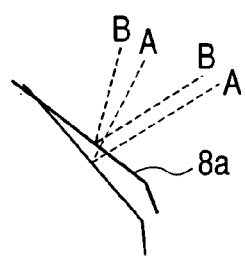
Figures 2, 14B:
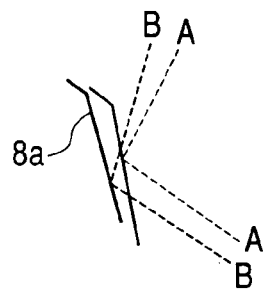
Figure 14C:
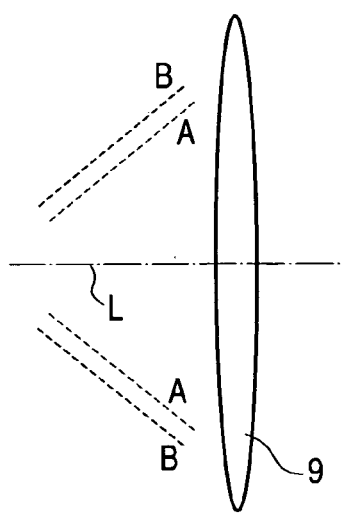
Figure 14D:
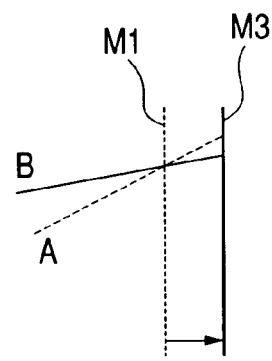
Figure 14E:
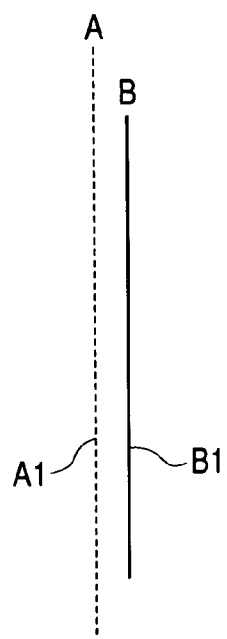

The meanings of respective elements in FIGS. 13A to 13E are similarly used for FIGS. 14A to 14E and 15A to 15E. In the case where each of the light fluxes A and B is a divergent light flux, as shown in FIG. 14D, an actual image plane position M3 is further apart from the optical deflector as compared with an image plane position M1 caused by the parallel light fluxes. Therefore, as shown in FIG. 14E, the scanning line A1 formed (drawn) by the light flux "A" becomes longer than the scanning line B1 formed by the light flux "B". Thus, each of the light fluxes is made to have a suitable condensing state according to the tilt of the surface to be scanned, so that the nonuniformity of the lengths of the scanning lines can be reduced.

Next, "(2) the method of changing wavelengths of respective light fluxes" will be described.

There is a scanning optical unit that corrects a magnification of chromatic aberration by using a plurality of glass materials therefor or providing a diffraction optical plane. However, the magnification of chromatic aberration is caused in a large number of scanning optical units. In such a case, the lengths of the scanning lines formed by the respective light fluxes can be controlled by intentionally changing the wavelengths of respective light fluxes. Therefore, the wavelength of each of the light fluxes is changed according to the tilt of the surface to be scanned, so that the nonuniformity of lengths of the scanning lines can be reduced.

Figure 15A:
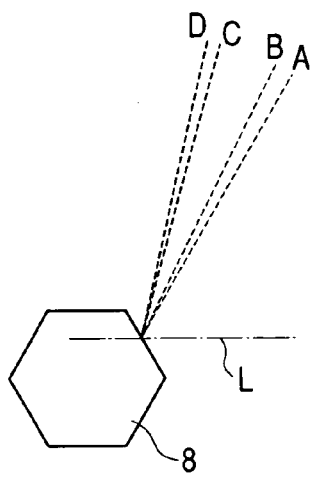
Figures 1, 15B:
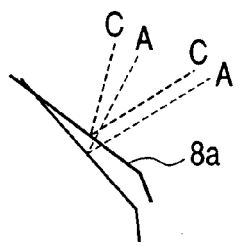
Figures 2, 15B:
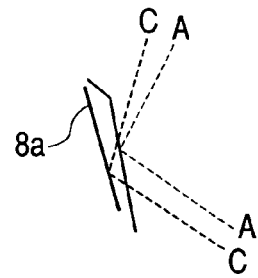

Incidentally, when respective light fluxes "A", "B", "C", and "D" are entered into the optical deflector 8 at irregular angles within the main-scanning section as shown in FIG. 15A, the following problems occur.

Figure 15C:
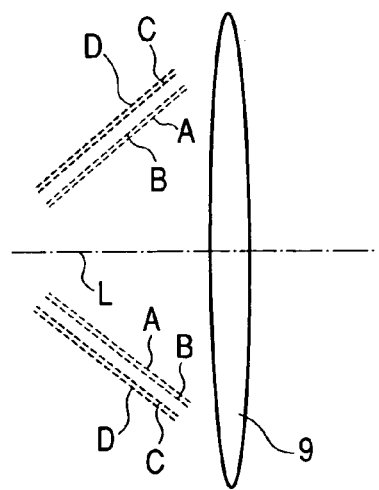
Figure 15D:
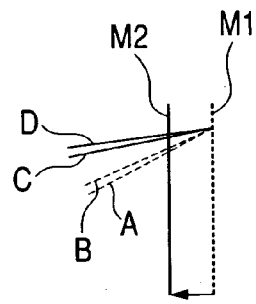
Figure 15E:
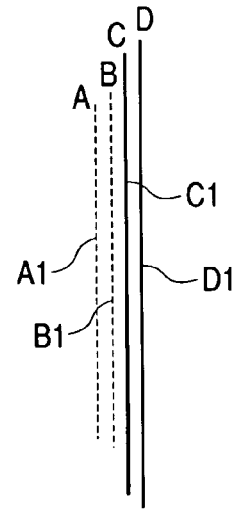

Here, assume that a configuration in which two two-beam lasers are used for a light source unit is employed and the light fluxes emitted from the respective light-emitting points (not shown) are given by "A", "B", "C", and "D" in ascending order of distance from the optical axis L of the scanning optical unit 9 as in the above-mentioned case. Note that, in FIGS. 15A to 15E, the light flux "A" and the light flux "B" are emitted from one two-beam laser and the light flux "C" and the light flux "D" are emitted from the other two-beam laser. As described above, when the respective light fluxes are deflected and reflected in the same direction (in parallel), the positions of the deflection points of the respective light fluxes change. As shown in FIG. 15A, when the respective light fluxes are entered into the optical deflector 8 at irregular angles, the way of displacement of the deflection point changes according to a difference among the incident angles. Therefore, as shown in FIG. 15C, the respective light fluxes "A", "B", "C", and "D" which have deflected and reflected are in a positional relationship of irregular intervals. Thus, as shown in FIG. 15E, when non-parallel light fluxes (convergent light fluxes in FIG. 15A) are entered into the scanning optical unit 9, a difference between the lengths of the scanning lines formed by the light flux "B" and the light flux "C" becomes larger than a difference between the lengths of the scanning lines formed by the light flux "A" and the light flux "B" and a difference between the lengths of the scanning lines formed by the light flux "C" and the light flux "D".

With respect to the lengths of the scanning lines changed according to the tilt of the surface to be scanned, the difference between the lengths of the scanning lines formed by the light flux "A" and the light flux "B", the difference between the lengths of the scanning lines formed by the light flux "B" and the light flux "C", and a difference between the lengths of the scanning lines formed by the light flux "C" and the light flux "D" are substantially equal to one another. Therefore, it is hard to preferably reduce the differences by only "(1) the method of converting the light flux which is entered into the scanning optical unit into the non-parallel light flux with respect to the main-scanning section".

However, a problem is a difference between the lengths of the scanning lines formed by the light flux "A" and the light flux "D". Therefore, in the case where each difference, for example, the order the difference between the lengths of the scanning lines formed by the light flux "A" and the light flux "B" is allowable, it is possible to correct the nonuniformity by making substantially equal the lengths of the scanning lines formed by the light flux "A" and the light flux "C" to each other.

In the case where the nonuniformity of the lengths of the scanning lines are corrected by only a method of only using "(2) the method of changing the wavelengths of the respective light fluxes", it is required that the wavelengths of all light fluxes are difference from one another. In other words, four types of light sources are required. In particular, in the case of a structure in which the two two-beam lasers are used in view of the concept shown in FIGS. 15A to 15E, it is necessary to prepare two types of two-wavelength lasers. In the case where the non-parallel light fluxes cannot be used because of the reason that, for example, the influence of plane eccentricity of the optical deflector cannot be neglected, the above-mentioned correction is required. However, the use of plural types of light sources causes the disadvantage in cost. Therefore, in the case where the cost is important, the use of "(2) the method of changing wavelengths of respective light fluxes" to correct the uniformity of the lengths of the scanning lines is not particularly preferable.

However, as in the above-mentioned case, a problem is the difference between the lengths of the scanning lines formed by the light flux "A" and the light flux "D". Therefore, in the case where each difference, for example, such a difference between the lengths of the scanning lines formed by the light flux "A" and the light flux "B" is allowable, a wavelength difference is provided between the light flux A or B and the light flux C or D (A=B≠C=D). Thus, it is possible that the length of the scanning line formed by the light flux "A" is substantially equal to the length of the scanning line formed by the light flux "C" to reduce the nonuniformity of the lengths of the scanning lines. In this case, because it is unnecessary to use the two-wavelength laser, an increase in cost can be suppressed.

Therefore, when the respective light fluxes "A", "B", "C", and "D" are entered into the optical deflector 8 at irregular angles as shown in FIG. 15A, even in the case where one of the two methods is used to make substantially equal the lengths of the scanning lines formed by the light fluxes "A", "B", "C", and "D" to one another, a problem is caused. Thus, it is preferable to use both the methods. Here, assume that there is a variation J91 in lengths of the scanning lines as shown in FIG. 16A.

Figure 16A:
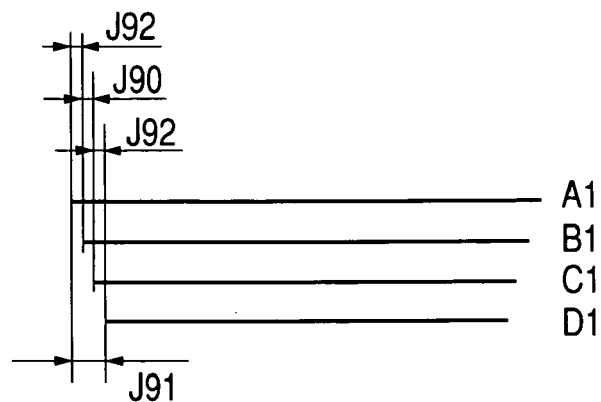
FIGS. 16A, 16B, 16C, and 16D are explanatory views showing a scanning line correction method.

In FIG. 16A, a variation J92 in scanning line lengths between the scanning line A1 and the scanning line B1 becomes plus, a variation J90 in scanning line lengths between the scanning line B1 and the scanning line C1 becomes plus, and a variation J92 in scanning line lengths between the scanning line C1 and the scanning line D1 becomes plus.

Figure 16B:
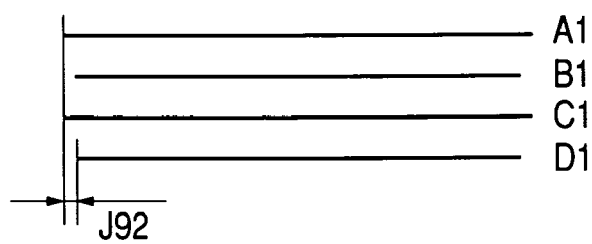
Figure 16C:
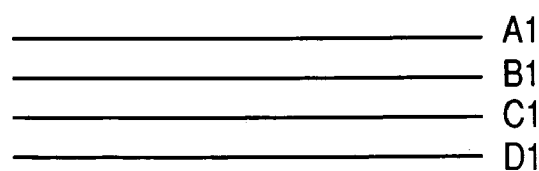

"1) The method of converting the light flux which is entered into the scanning optical unit into the non-parallel light flux with respect to the main-scanning section" is used to cause a variation Δ2. Therefore, the difference of scanning line length between the scanning line A1 and the scanning line C1 and the difference of scanning line length between the scanning line B1 and the scanning line D1 are corrected as shown in FIG. 16B. Further, the same order of wavelength difference is provided between the scanning line A1 and the scanning line B1 and between the scanning line C1 and the scanning line D1 (that is, one type of a two-wavelength laser is used) to cause a variation Δ3. Therefore, the difference J92 in scanning line lengths between the scanning line A1 and the scanning line B1 and the difference J92 in scanning line lengths between the scanning line C1 and the scanning line D1 are corrected to a state shown in FIG. 16C.

Figure 16D:
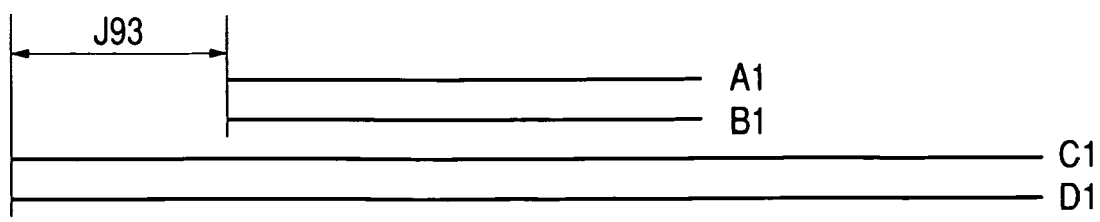

Alternatively, "(1) the method of converting the light flux which is entered into the scanning optical unit into the non-parallel light flux with respect to the main-scanning section" is used, and the difference of scanning line length between the scanning line A1 and the scanning line B1 and the difference of scanning line length between the scanning line C1 and the scanning line D1 are corrected as shown in FIG. 16D. Further, the same order of wavelength difference is provided between the scanning line A1 and the scanning line B1 and between the scanning line C1 and the scanning line D1 (that is, two types of the two-wavelength lasers are used). Therefore, a difference J3 in scanning line lengths between the scanning line A1 and the scanning line C1 (between the scanning line B1 and the scanning line D1), to which the difference of scanning line length caused by using the non-parallel light fluxes is added is corrected to a state shown in FIG. 16C.

The former correction method will be specifically described. Assume that a variation in lengths of the scanning lines which is caused when the four light fluxes "A", "B", "C", and "D" are allowed to enter to the surface to be scanned at angles within the sub-scanning section is $\Delta Y1$, a variation in lengths of the scanning lines which is caused when the four light fluxes "A", "B", "C", and "D" are allowed to enter as non-parallel light fluxes to the deflection surface within the main-scanning section is $\Delta Y2$, and a variation in lengths of the scanning lines which is caused from a difference of wavelength between the light flux "A" and the light flux "B" (light fluxes "C" and "D") is $\Delta Y3$.

In the example shown in FIG. 16A, the following relationship, $$\Delta Y1 = J91 = J90 + 2 \times J92$$

is established. A variation (J92+J90) in lengths between the scanning line A1 and the scanning line C1 is corrected using $\Delta Y2$ (sign becomes minus). In addition, a variation J92 in lengths between the scanning line A1 (C1) and the scanning line B1 (D1), is corrected using $\Delta Y3$ (sign becomes minus). That is, $$J92 + J90 = -\Delta Y2$$

$$J92 = -\Delta Y3$$

$$\Delta Y1 + \Delta Y2 + \Delta Y3 = 0$$

In the present invention, respective elements are set to satisfy the following conditional expression, $$|\Delta Y1 + \Delta Y2 + \Delta Y3| < |\Delta Y1| \quad (1)$$

The conditional expression (1) is to reduce the variation in lengths of the scanning lines, which is caused when the three or more light fluxes are allowed to enter to the surface to be scanned at angles within the sub-scanning section. If the conditional expression (1) is not satisfied, the variation in lengths of the scanning lines becomes larger. Therefore, it is not preferable because a high quality image cannot be obtained.

Figure 4:
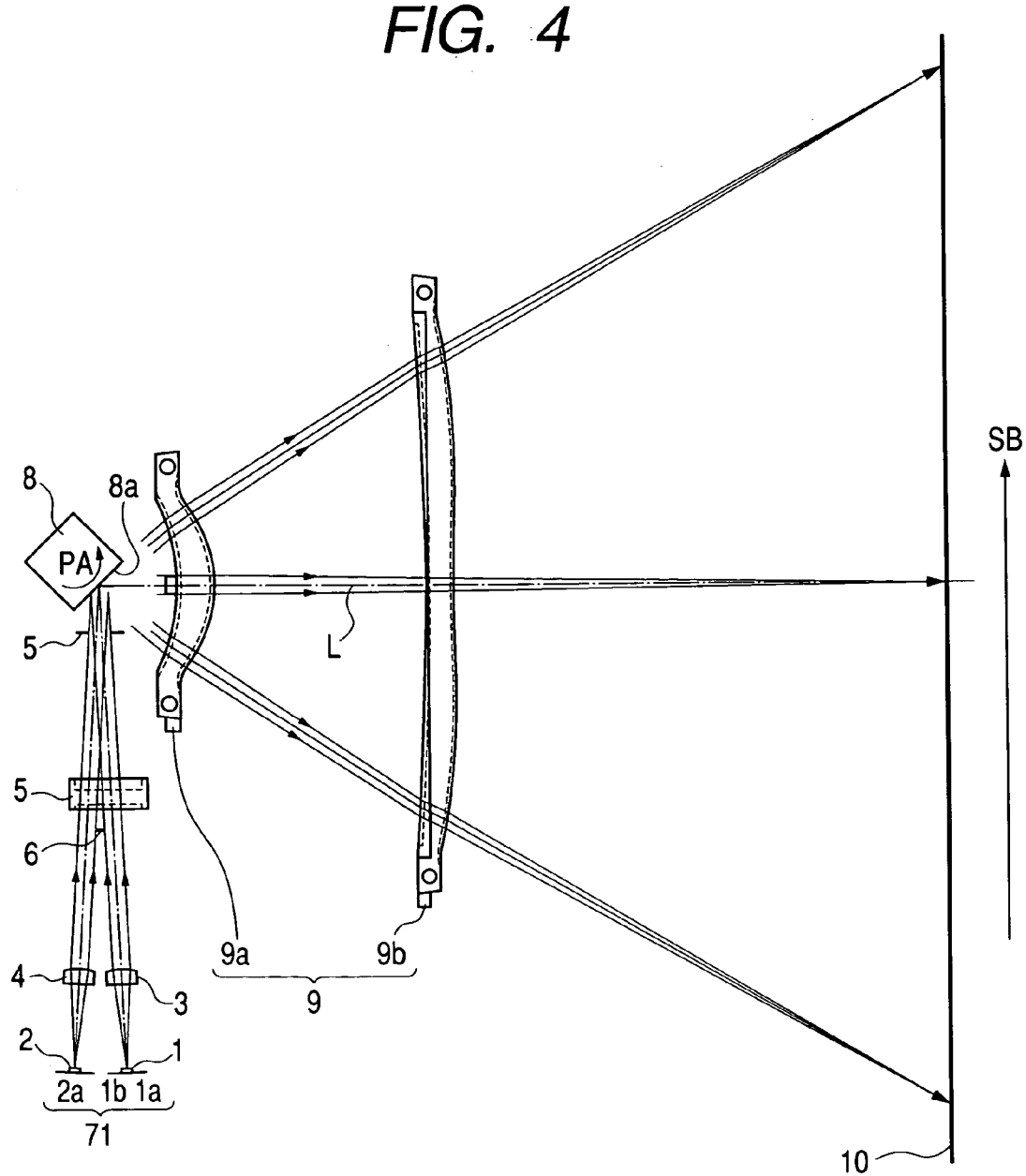
FIG. 4 is a main-scanning sectional view in the case where a single LD and a two-beam LD are used instead of a light source unit according to Embodiment 1 of the present invention.
Figure 17:
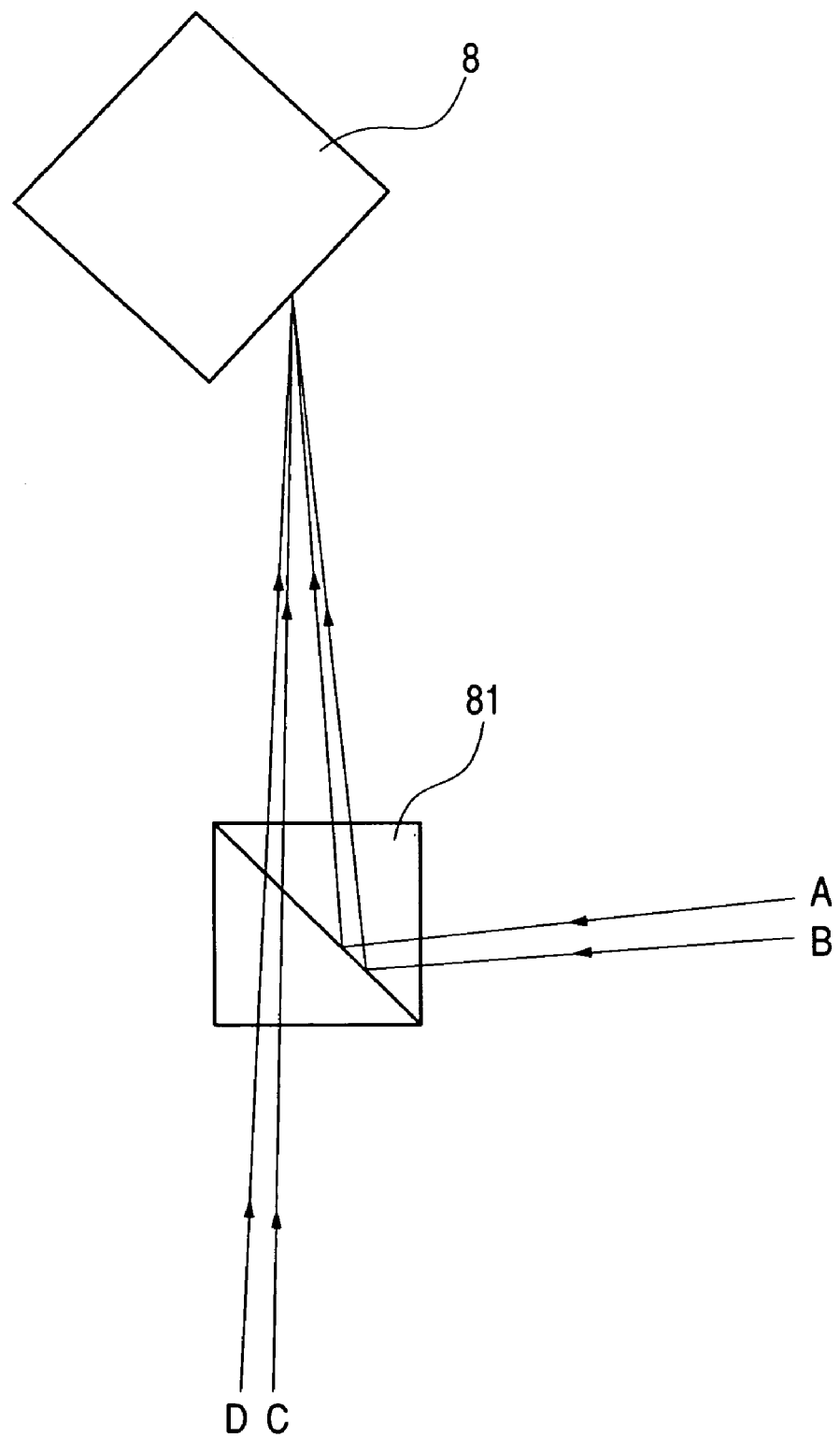
FIG. 17 is a main part schematic view showing an example of irregular incidence (prism synthesis) to a deflection unit.

Note that the above description is not limited to the structure using the two two-beam lasers. Therefore, the description is established in all cases where light fluxes are entered into the optical deflector at irregular angles at a time when the light fluxes are obliquely projected within the main-scanning section. For example, the description is similarly established in the case where a single laser 2 and a two-beam laser 1 are used as shown in FIG. 4 described later and in the case where the respective light fluxes "A", "B", "C", and "D" are synthesized by a synthesizing unit 81 such as a prism as shown in FIG. 17 and then entered into the optical deflector 8 at irregular angles.

Next, respective embodiments of the present invention will be described.

Embodiment 1

FIG. 1 is a main part sectional view (main scanning sectional view) showing a multi-beam scanning optical system in the main scanning direction, according to Embodiment 1 of the present invention.

Here, the main-scanning direction indicates a direction perpendicular to the rotational axis of a deflection unit and the optical axis of a scanning optical unit (direction of a light flux which is deflected and reflected (which is deflected for scanning) by the deflection unit). A sub-scanning direction indicates a direction parallel to the rotational axis of the deflection unit. In addition, the main-scanning section indicates a plane which is parallel to the main-scanning direction and includes the optical axis of the scanning optical unit. The sub-scanning section indicates a section perpendicular to the main-scanning section.

In FIG. 1, a light source device 61 includes two light source units (each composed of a monolithic two-beam laser) 1 and 2. The light source unit 1 has two light-emitting points 1a and 1b. The light source unit 2 has two light-emitting points 2a and 2b. In this embodiment, the light fluxes "A" and "B" are emitted from the light-emitting points 1a and 1b of the light source unit 1, and the light fluxes "C" and "D" are emitted from the light-emitting points 2a and 2b of the light source unit 2.

Note that the number of light source units and the number of light-emitting points are not limited to two. In addition, each of the light source units in this embodiment is not limited to a monolithic multi-beam laser and includes a unit which acts as a single light source unit in adjustment, such as a light source unit 207 in Embodiment 2 described later.

As shown in FIG. 2, the light-emitting points 1a (2a) and 1b (2b) which are provided in the light source units 1 (2) are arranged apart from each other in the main-scanning direction and the sub-scanning direction. A distance between the light-emitting points in the main-scanning direction is longer than a distance between the light-emitting points in the sub-scanning direction. This is because an actual distance between the light-emitting points is longer than an actually necessary distance between the light emitting points in the sub-scanning direction and therefore the distance between the light emitting points in the sub-scanning direction is set to a desirable value by rotating the respective light source units.

Reference numerals 3 and 4 each denote a light flux conversion element (collimator lens). The collimator lens 3 converts the light fluxes "A" and "B" emitted from the light source unit 1 into weak convergent light fluxes. The collimator lens 4 converts the light fluxes "C" and "D" emitted from the light source unit 2 into weak convergent light fluxes. A lens system (cylindrical lens) 5 has predetermined refractive power in only the sub-scanning direction. Reference numerals 6 and 7 each denote an aperture diaphragm. The aperture diaphragm 6 limits the insides and the sub-scanning direction sides of the respective light fluxes and the aperture diaphragm 7 limits the outsides of the respective light fluxes. Therefore, the respective light fluxes are formed in a most suitable beam shape.

In this embodiment, the aperture diaphragms 6 and 7 are disposed near the deflection surface 8a of the deflection unit 8 described later, so that the deflection points of the light fluxes "A" and "B" and the deflection points of the light fluxes "C" and "D" are close to one another. Therefore, a displacement in dot position (displacement in scanning image heights of the respective scanning lines) is reduced.

Note that the respective elements such as the light source units 1 and 2, the collimator lenses 3 and 4, the cylindrical lens 5, and the aperture diaphragms 6 and 7 compose an incident optical unit.

The optical deflector 8 serving as the deflection unit is composed of, for example, a rotating polygonal mirror (polygon mirror) and rotated in a direction indicated by an arrow PA in FIG. 1 at a constant speed by a drive unit such as a motor (not shown). In this embodiment, the respective light fluxes "A", "B", "C", and "D" which are emitted from the light source device 61 are entered into the deflection surface 8a of the optical deflector 8 at irregular angles within the main-scanning section.

A scanning optical unit (fθ lens system) 9 having an fθ characteristic includes two first and second optical elements (fθ lenses) 9a and 9b. According to the scanning optical unit 9, the four light fluxes "A", "B", "C", and "D" which are deflected by the optical deflector 8 are imaged in a spot shape onto a surface to be scanned (photosensitive drum surface) 10 to form four scanning lines. The scanning optical unit 9 has a function of compensating an image plane tilt by holding a conjugate relationship between the deflection surface 8a or its vicinity of the optical deflector 8 and the photosensitive drum surface 10 or its vicinity within the sub scanning section. Reference numeral 10 denotes the photosensitive drum surface serving as the surface to be scanned.

In this embodiment, according to image information, the light fluxes "A" and "B" are optically modulated by the light source unit 1 and emitted from the light-emitting points 1a and 1b thereof, and the light fluxes "C" and "D" are optically modulated by the light source unit 2 and emitted from the light-emitting points 2a and 2b thereof. Then, the light fluxes "A" and "B" are converted into weak convergent light fluxes by the collimator lens 3. The light fluxes "C" and "D" are converted into weak convergent light fluxes by the collimator lens 4.

Next, the left side of the light fluxes "A" and "B" in FIG. 1 are limited by the aperture diaphragm 6 and the right side of the light fluxes "C" and "D" in FIG. 1 are limited by the aperture diaphragm 6. After the light fluxes "A", "B", "C", and "D" are transmitted through the cylindrical lens 5, the right sides of the light fluxes "A" and "B" in FIG. 1 are limited by the aperture diaphragm 7 and the left sides of the light fluxes "C" and "D" in FIG. 1 are limited by the aperture diaphragm 7. The up-and-down direction (sub-scanning direction) sides (upper side and lower side) of the light fluxes are limited by the aperture diaphragm 6. Of the light fluxes entered into the cylindrical lens 5, light fluxes within the main scanning section are exited without changing an optical state. Light fluxes within the sub scanning section are converged and imaged as a substantial linear image (linear image extended in the main scanning direction) onto the deflection surface 8a of the optical deflector 8.

After that, the four light fluxes "A", "B", "C", and "D" which are deflected and reflected on the deflection surface 8a of the optical deflector 8 are imaged in a spot shape onto the photosensitive drum surface 10 through the scanning optical unit 9. At this time, the optical deflector 8 is rotated in the direction indicated by the arrow PA, so that photosensitive drum surface 10 is optically scanned in a direction indicated by an arrow SB (main scanning direction) at a constant speed. Therefore, image recording is performed on the photosensitive drum surface 10 composing a recording medium.

In this embodiment, a two-beam laser having a light-emitting point interval of 90 μm is used for each of the light source units 1 and 2 and located at an angle of 6° relative to the main scanning direction. A convergent degree that light is condensed at a location apart from the optical deflector 8 by a distance of 6094 mm in the case where the influence of the scanning optical unit is neglected is provided to each of the light fluxes.

For the optical deflector 8, a rotating four-face mirror having an outside diameter of 20 mm is used and a printing region (effective scanning region) of ±107 mm is scanned at a scanning angle of ±40.87° thereby. A photosensitive drum having a diameter of 30 mm is used as a recording medium and the respective light fluxes are allowed to enter at an angle of about 7° relative to the sub-scanning direction. A scanning line interval is set to 42.3 μm corresponding to 600 dpi. Because the light fluxes are entered into the photosensitive drum surface at an angle of 7°, an optical path length up to the photosensitive drum surface 10, of the light flux "A" emitted from the light-emitting point nearest the optical axis L of the scanning optical unit 9 becomes longest. In contrast to this, an optical path length up to the photosensitive drum surface 10, of the light flux "D" emitted from the light-emitting point farthest the optical axis L of the scanning optical unit 9 becomes shortest.

Here, when the respective light fluxes "A", "B", "C", and "D" are allowed to enter as parallel light fluxes into the scanning optical unit 9, the scanning line formed by the light flux "A" becomes longer than the scanning line formed by the light flux "D". Therefore, a drum oblique incident jitter (deviation in scanning image height which is caused by the tilt of the photosensitive drum surface (variation in scanning line length)) of 8.3 μm is caused in both ends of the printing region.

In this embodiment, the above-mentioned drum oblique incident jitter is corrected using a convergent jitter (deviation in scanning image heights caused when the non-parallel light fluxes are entered into the scanning optical unit) and a wavelength difference jitter (deviation in scanning image heights caused in the case where the wavelengths of the respective light fluxes are different from one another).

More specifically, a drum oblique incident jitter of 5.5 μm resulting from the light flux "A" and the light flux "C" (⅔ of a drum oblique incident jitter of 8.3 μm resulting from the light flux "A" and the light flux "D") is corrected by providing the above-mentioned convergent degree to each of the light fluxes "A", "B", "C", and "D". Therefore, the length of the scanning line formed by the light flux "A" becomes equal to the length of the scanning line formed by the light flux "C".

Note that, even if the above-mentioned convergent degree is provided to each of the light fluxes, a drum oblique incident jitter of 2.8 μm resulting from the light flux "A" and the light flux "B" (⅓ of the drum oblique incident jitter of 8.3 μm resulting from the light flux "A" and the light flux "D") is reduced by 0.24 μm. This is because the convergent jitter is substantially proportional to an incident angle to the optical deflector and a difference of incident angle between the light flux "A" and the light flux "B" is a very small value of 0.26° as compared with the case where a difference of incident angle between the light flux "A" and the light flux "C" is 6°.

Thus, in this embodiment, a difference of 2.6 µm between the lengths of the scanning lines formed by the light flux "A" and the light flux "B" is corrected by making the wavelength of the light flux "B" longer than the wavelength of the light flux "A" by 2.1 nm.

Figure 3A:
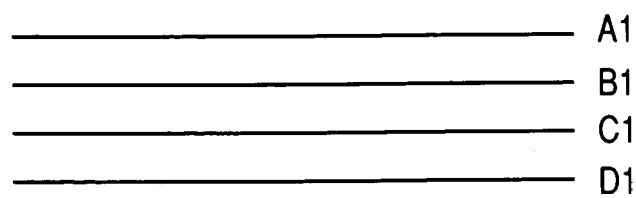
FIGS. 3A and 3B are explanatory views showing a positional relationship among scanning lines according to Embodiment 1 of the present invention.
Figure 3B:
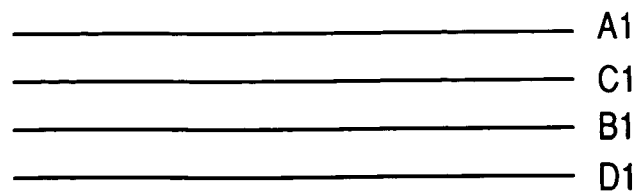

In this embodiment, as shown in FIG. 3A, the scanning lines A1, B1, C1, and D1 formed by the respective light fluxes "A", "B", "C", and "D" are arranged in this order. In the case where both the two methods are used as described above, the drum oblique incident jitter can be substantially completely corrected. Therefore, for example, as shown in FIG. 3B, the order of the scanning lines may be the order of the scanning lines A1, C1, B1, and D1 formed by the respective light fluxes "A", "C", "B", and "D".

Also, the two two-beam lasers are used in this embodiment. However, the number of lasers and the number of light-emitting points per laser are not limited to the case using the two two-beam lasers. For example, as shown in FIG. 4, even in a structure of a light source unit 71 using the two-beam laser 1 and the single beam laser 2, it is possible to correct the drum oblique incident jitter. As shown in FIG. 4, there are the light fluxes "A" and "B" emitted from the two-beam laser 1 and the light flux "C" emitted from the single beam laser 2 in ascending order of distance from the optical axis L of the scanning optical unit 9. In this case, the convergent degree is provided to each of the light fluxes such that an average of the lengths of the scanning lines formed by the light fluxes "A" and "B" is equal to the length of the scanning line formed by the light flux "C". A wavelength difference is provided with respect to the difference between the lengths of the scanning lines formed by the light fluxes "A" and "B". Thus, the drum oblique incident jitter can be corrected.

Note that, in the case where the optical path length up to the surface to be scanned 10, of the light flux emitted from the light-emitting point nearest the optical axis L of the scanning optical unit 9 is shorter than the optical paths length up to the surface to be scanned 10, of the light fluxes emitted from other light-emitting points, the light flux which is deflected and reflected on the deflection unit 8 may be converted into a divergent light flux. A jitter at this time is called a divergent jitter (deviation in scanning image heights caused when the non-parallel light fluxes are entered into the scanning optical unit).

As described above, according to this embodiment, the difference between the lengths of the scanning lines formed by the light fluxes "A" and "B" is corrected using the wavelength difference jitter so as to satisfy the above-mentioned conditional expression (1). In addition, the difference between the lengths of the scanning lines formed by the light fluxes "A" and "C" is corrected using the convergent jitter so as to satisfy the above-mentioned conditional expression (1). Therefore, it is possible to reduce the variation in lengths of the scanning lines, which is caused when the three or more light fluxes are entered into the surface to be scanned at angles within the sub-scanning section. Thus, a multi-beam scanning optical system capable of performing high quality printing at high speed is obtained.

Embodiment 2

Figure 5:
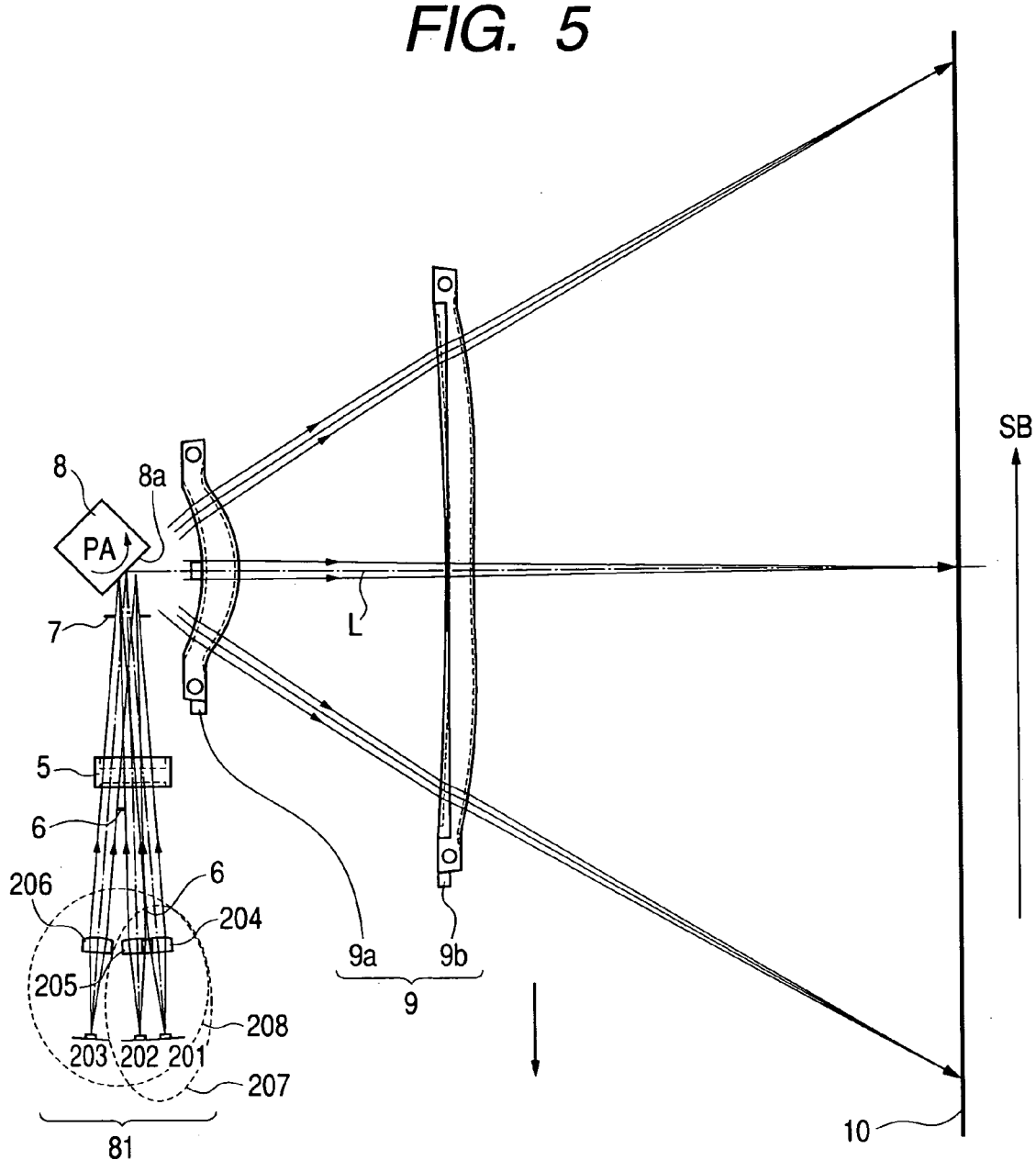
FIG. 5 is a main-scanning sectional view according to Embodiment 2 of the present invention.

FIG. 5 is a main part sectional view (main scanning sectional view) showing a multi-beam scanning optical system in the main scanning direction, according to Embodiment 2 of the present invention. In FIG. 5, the same references are provided to the same elements as shown in FIG. 1.

This embodiment is particularly different from the above-mentioned Embodiment 1 in that:

(1) the difference between the lengths of the scanning lines formed by the light fluxes "A" and "B" is corrected using the convergent jitter and the difference between the lengths of the scanning lines formed by the light fluxes "A" and "C" is corrected using the wavelength difference jitter;

(2) three single lasers are used; and (3) a collimator lens (light flux conversion element) is provided to each of the single lasers. Points which are not particularly described, such as the scanning line interval or the incident angle to the surface to be scanned, are the same as in Embodiment 1.

In this embodiment, single lasers 201 and 202 and collimator lenses 204 and 205 compose a light source unit 207. Further, the light source unit 207, a single laser 203, and a collimator lens 206 compose a light source unit 208. Each of the light source units 207 and 208 composes an element of a light source device 81.

In the adjustment of the scanning line interval, first, the entire optical source unit 208 is rotated to adjust an interval between the center of the scanning lines formed by the single lasers 201 and 202 and the scanning line formed by the single laser 203. Further, the light source unit 207 is rotated to adjust an interval between the scanning lines formed by the single lasers 201 and 202.

Note that, in order to provide the above-mentioned rotatable structure, a difference between angles at when the light fluxes "A" and "B" emitted from the single lasers 201 and 202 are entered into the deflection surface 8a of the optical deflector 8 is set to 3°. On the other hand, a difference between angles at when the light fluxes "B" and "C" emitted from the single lasers 202 and 203 are entered into the deflection surface 8a is set to 6°. Therefore, the light fluxes are entered into the deflection surface 8a at irregular angles.

Figure 6A:
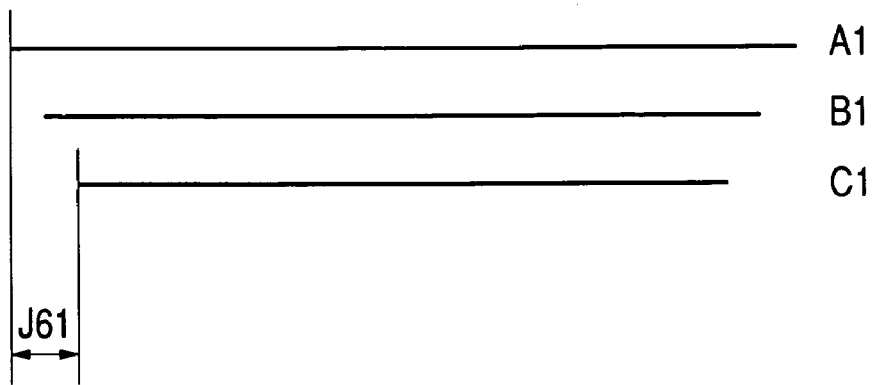
FIGS. 6A, 6B, and 6C are explanatory views showing a correction method according to Embodiment 2 of the present invention.
Figure 6B:
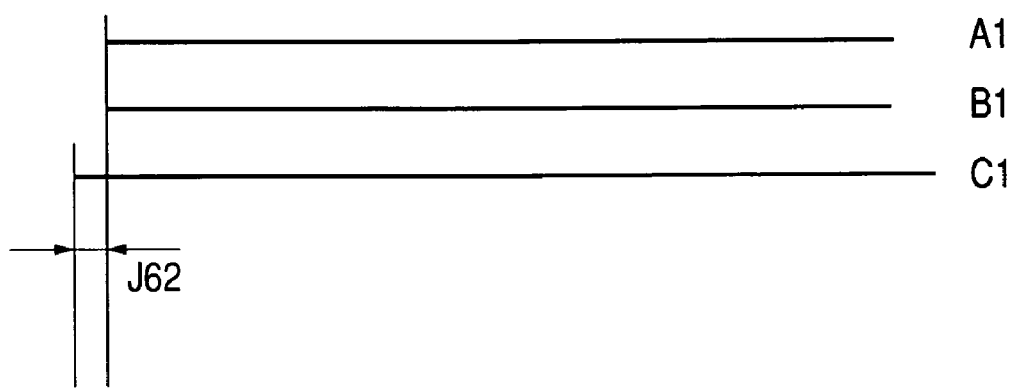

In this embodiment, all the light fluxes "A", "B", and "C" which are exited from the collimator lenses are converted into the convergent light fluxes. Therefore, a difference between the lengths of the scanning lines formed by the single lasers 201 and 202 is reduced. More specifically, a convergent degree that light is condensed at a location apart from the optical deflector 8 by a distance of 3017 mm in the case where the influence of the scanning optical unit 9 is neglected is provided. Thus, a difference of 2.8 µm (½ of J61 shown in FIG. 6A) between the lengths of the scanning lines A1 and B1 formed by the light fluxes "A" and "B" is corrected (see FIGS. 6A and 6B).

Note that, in the case where only the above-mentioned correction is performed, a difference of incident angle between the light fluxes "A" and "B" entered into the optical deflector 8 is 3° but a difference of incident angle between the light fluxes "B" and "C" is 6°. Therefore, in this state, the scanning line C1 formed by the light flux "C" becomes longer than the scanning lines A1 and B1 formed by the light fluxes "A" and "B" by 2.8 µm (J62 shown in FIG. 6B) in each end (see FIG. 6B).

Figure 6C:
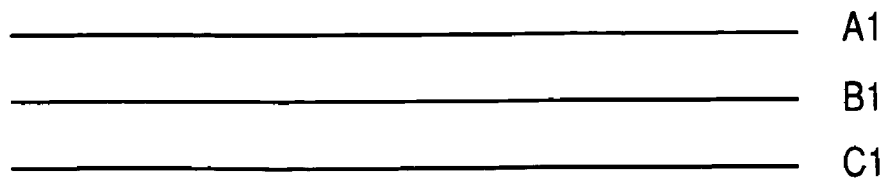

Thus, in this embodiment, the above-mentioned difference between the lengths of the scanning lines is corrected by setting the wavelength of the light flux "C" shorter than the wavelengths of the light fluxes "A" and "B" by 2.3 nm (see FIG. 6C).

As described above, according to this embodiment, the difference between the lengths of the scanning lines formed by the light fluxes "A" and "B" is corrected using the convergent jitter so as to satisfy the above-mentioned conditional expression (1). In addition, the difference between the lengths of the scanning lines formed by the light fluxes "A" and "C" is corrected using the wavelength difference jitter so as to satisfy the above-mentioned conditional expression (1). Thus, the same effect as in Embodiment 1 is obtained.

Embodiment 3

Next, Embodiment 3 of the present invention will be described. Note that Embodiment 3 will be described with reference to FIG. 1 because a structure according to this embodiment is similar to the structure according to Embodiment 1.

This embodiment is particularly different from Embodiment 1 in that:

(1) the difference between the lengths of the scanning lines formed by the light fluxes "A" and "C" is corrected using the convergent jitter and the difference between the lengths of the scanning lines formed by the light fluxes "A" and "B" is not particularly corrected; and (2) the allowable amount of jitter is increased. Points which are not particularly described, such as the scanning line interval or the incident angle to the surface to be scanned, are the same as in Embodiment 1.

With respect to generally cost-conscious products, a reduction in cost is realized by making a concession regarding the function and the performance of a part of a product. In this embodiment, the difference between the lengths of the scanning lines in design values is allowed up to 3 μm in each end, so that the wavelengths of the light fluxes "A", "B"; "C", and "D" are made equal to one another, thereby reducing a cost of the light source unit.

Figure 7A:
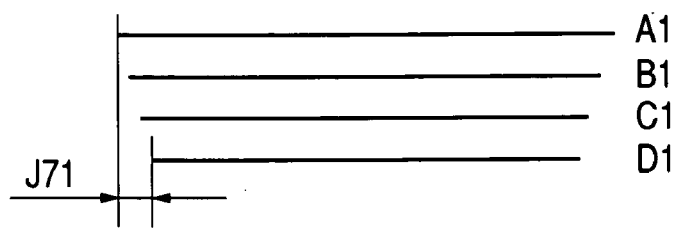
FIGS. 7A, 7B, 7C, and 7D are explanatory views showing a correction method according to Embodiment 3 of the present invention.

More specifically, as in Embodiment 1, a convergent degree that light is condensed at a location apart from the optical deflector 8 by a distance of 6094 mm in the case where the influence of the scanning optical unit 9 is neglected is involved in each of the light fluxes. Therefore, the lengths of the scanning lines A1 and C1 formed by the light flux "A" and the light flux "C" are made equal to each other, so that the drum oblique incident jitter of 8.3 μm (J71 shown in FIG. 7A) before correction (see FIG. 7A) is reduced to 2.6 μm (J72 shown in FIG. 7B) (see FIG. 7B).

In the case where the drum oblique incident jitter is corrected using only the convergent jitter as in Embodiment 3, it is necessary to correct a relationship that the difference of incident angle to the optical deflector 8 is large (scanning lines Al and Cl formed by the light fluxes "A" and "C") using the convergent jitter. The reason is as follows. The convergent jitter is proportional to the difference of incident angle to the optical deflector 8 in addition to the convergent degree. Therefore, a relationship that the difference of incident angle to the optical deflector 8 is small (scanning lines A1 and B1 formed by the light fluxes "A" and "B") is assumed to be corrected using the convergent jitter, leading to the large difference between the lengths of the scanning lines formed by the light fluxes in the relationship that the difference of incident angle to the optical deflector 8 is large (J73 shown in FIG. 7C). Suppose that the drum oblique incident jitter resulting from the light fluxes "A" and "B" is corrected in the structure according to Embodiment 3. In such a case, even if the drum oblique incidence is taken into an account, each of the lengths of the scanning lines A1 and C1 formed by the light fluxes "A" and "C" becomes longer by 61.1 μm in each end (see FIG. 7C).

In the case where the drum oblique incident jitter is corrected using only the convergent jitter as in Embodiment 3 and in the case where the drum oblique incident jitter between light source units is corrected using only the wavelength difference jitter as in Embodiment 4 described later, it is not preferable to draw a scanning line formed by a light source unit between scanning lines formed by another light source unit.

Figure 7B:
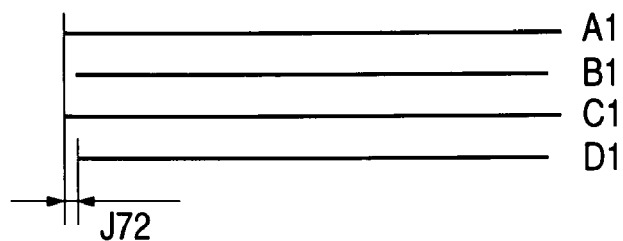
Figure 7C:
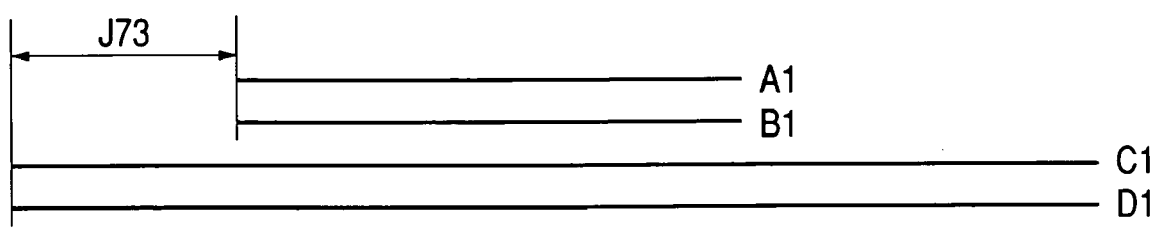
Figure 7D:
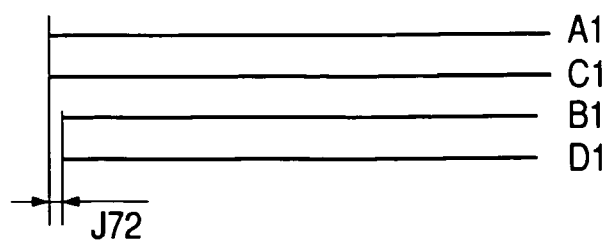

In Embodiment 3, the scanning line lengths are corrected. As a result, as shown in FIG. 7B, the length is changed every scanning line. In contrast to this, in the case where the scanning lines A1 and C1 formed by the light fluxes "A" and "C" are made adjacent to each other, a relationship among the scanning lines as shown in FIG. 7D is obtained. In such a case, the scanning line length is changed every two lines.

In general, in the case where the scanning line length is periodically changed, a long periodic change becomes noticeable. Therefore, in the case where the scanning lines are corrected using only the convergent jitter, it is preferable not to draw a scanning line formed by a light source unit between scanning lines formed by another light source unit as in Embodiment 3.

As described above, according to this embodiment, the difference between the lengths of the scanning lines formed by the light fluxes "A" and "C" is corrected using the convergent jitter so as to satisfy the above-mentioned conditional expression (1). The difference between the lengths of the scanning lines formed by the light fluxes "A" and "B" is not particularly corrected. Thus, the same effect as in Embodiment 1 is obtained.

Embodiment 4

Next, Embodiment 4 of the present invention will be described. Note that Embodiment 4 will be described with reference to FIG. 1 because a structure according to this embodiment is similar to the structure according to Embodiment 1.

This embodiment is particularly different from Embodiment 1 in that:

(1) the difference between the lengths of the scanning lines formed by the light fluxes "A" and "C" is corrected using the wavelength difference jitter and the difference between the lengths of the scanning lines formed by the light fluxes "A" and "B" is not particularly corrected; and (2) the allowable amount of jitter is increased. Points which are not particularly described, such as the scanning line interval or the incident angle to the surface to be scanned, are the same as in Embodiment 1.

Similar to Embodiment 3, in this embodiment as well, the difference between the lengths of the scanning lines in design values is allowed up to 3 μm in each end, so that the wavelengths of the light fluxes "A" and "B", and the light fluxes "C" and "D" are made equal to one another, respectively, thereby reducing a cost of the light source unit without using the convergent light fluxes.

More specifically, the lengths of the scanning lines formed by the light flux "A" and the light flux "C" are made equal to each other by setting the wavelengths of the light fluxes "C" and "D" longer than the wavelengths of the light fluxes "A" and "B" by 4.7 nm. Therefore, the drum oblique incident jitter of 8.3 μm (see FIG. 7A) before correction (see FIG. 7A) is reduced to 2.8 μm (see FIG. 7B).

In the case where the drum oblique incident jitter is corrected using only two kinds of wavelengths as described in Embodiment 4, the following correction is preferable. Assuming that the total number of light fluxes is 2n (n: an integer which is equal to or larger than one), a wavelength difference is set between a light flux in which a scanning line becomes longest by the drum oblique incident jitter and a light flux in which a scanning line becomes an (n+1)th longest line such that the lengths of the scanning lines formed by the light fluxes are equal to each other. The jitter at this time can be reduced to (n−1)/(2n−1) of the jitter before correction. If the total number of light fluxes is. 2n+1 (n: an integer which is equal to or larger than one), it is preferable that:

(1) a wavelength difference is set such that the length of a scanning line which becomes longest by the drum oblique incident jitter and the length of a scanning line which becomes an (n+1)th or (n+2)th longest length are equal to each other;

(2) a wavelength difference is set such that the length of a scanning line which becomes an nth or (n+1)th longest length by the drum oblique incident jitter and the length of a scanning line which becomes shortest are equal to each other; or (3) a wavelength difference is set such that a state between (1) and (2) is obtained, for example, an average of the length of the scanning line which becomes longest and the length of the scanning line which becomes an nth or (n+1)th longest length is equal to an average of the length of the scanning line which becomes an (n+1)th or (n+2)th longest length and the length of the scanning line which becomes shortest. In any manner, the jitter at this time can be reduced to ½ of the jitter before correction.

In this embodiment, n=2. In addition, a wavelength difference of 4.7 nm is set between the light flux "A" in which the scanning line becomes longest by the drum oblique incident jitter and the light flux "C" in which the scanning line becomes the third longest line such that the lengths of the scanning lines are equal to each other. As a result, the drum oblique incident jitter of 8.3 μm (see FIG. 7A) before correction (see FIG. 7A) is reduced to 2.8 μm (see FIG. 7B).

Of course, the number of kinds of wavelengths is not limited to two. Therefore, the drum oblique incident jitter may be corrected using three or more kinds of wavelengths. In this case, assuming that the number of kinds of wavelengths is "m", a jitter can be reduced to 1/m or less of the jitter before correction.

Now, assume that the number of kinds of wavelengths is "m" and the number of light fluxes is "n". In this case, wavelength differences may be set such that the length of the longest scanning line, the length of a ((n/m)+1)th (in the case when a fraction is obtained, an integer near the fraction) longest scanning line, the length of a ((2n/m)+1)th (in the case when a fraction is obtained, an integer near the fraction) longest scanning line, . . . , and the length of an ({(m−1)n/m}+1)th (in the case when a fraction is obtained, an integer near the fraction) longest scanning line are equal to one another. For example, in the case of m=3 and n=8, wavelength differences may be set such that the lengths of first, third, and sixth longest scanning lines or the lengths of second, fourth, and seventh longest scanning lines are equal to one another.

As described above, according to this embodiment, the difference between the lengths of the scanning lines formed by the light fluxes "A" and "C" is corrected using the wavelength difference jitter so as to satisfy the above-mentioned conditional expression (1). The difference between the lengths of the scanning lines formed by the light fluxes "A" and "B" is not particularly corrected. Thus, the same effect as in Embodiment 1 is obtained.

Embodiment 5

Next, Embodiment 5 of the present invention will be described.

This embodiment is particularly different from Embodiment 1 in that:

(1) all corrections are performed using the wavelength difference jitter; and (2) two four-beam lasers are used to perform prism synthesis.

Points which are not particularly described, such as the scanning line interval or the incident angle to the surface to be scanned, are the same as in Embodiment 1.

In general, when the light fluxes are entered into the optical deflector, if the incident angle of each of the light fluxes is changed within the main-scanning section, imaging positions within the sub-scanning direction are deviated in the front-to-back direction as viewed from the optical deflector.

Therefore, in this embodiment, in order to suppress such a phenomenon, a plurality of light source units are arranged such that the angles of the light fluxes emitted therefrom are substantially equal to one another. With such an arrangement, it is hard to correct the drum oblique incident jitter using the convergent jitter because a difference between the incident angles to the optical deflector is small. Thus, the correction is performed using the wavelength difference jitter in this embodiment.

Hereinafter, Embodiment 5 will be described with reference to FIG. 8.

Figure 8:
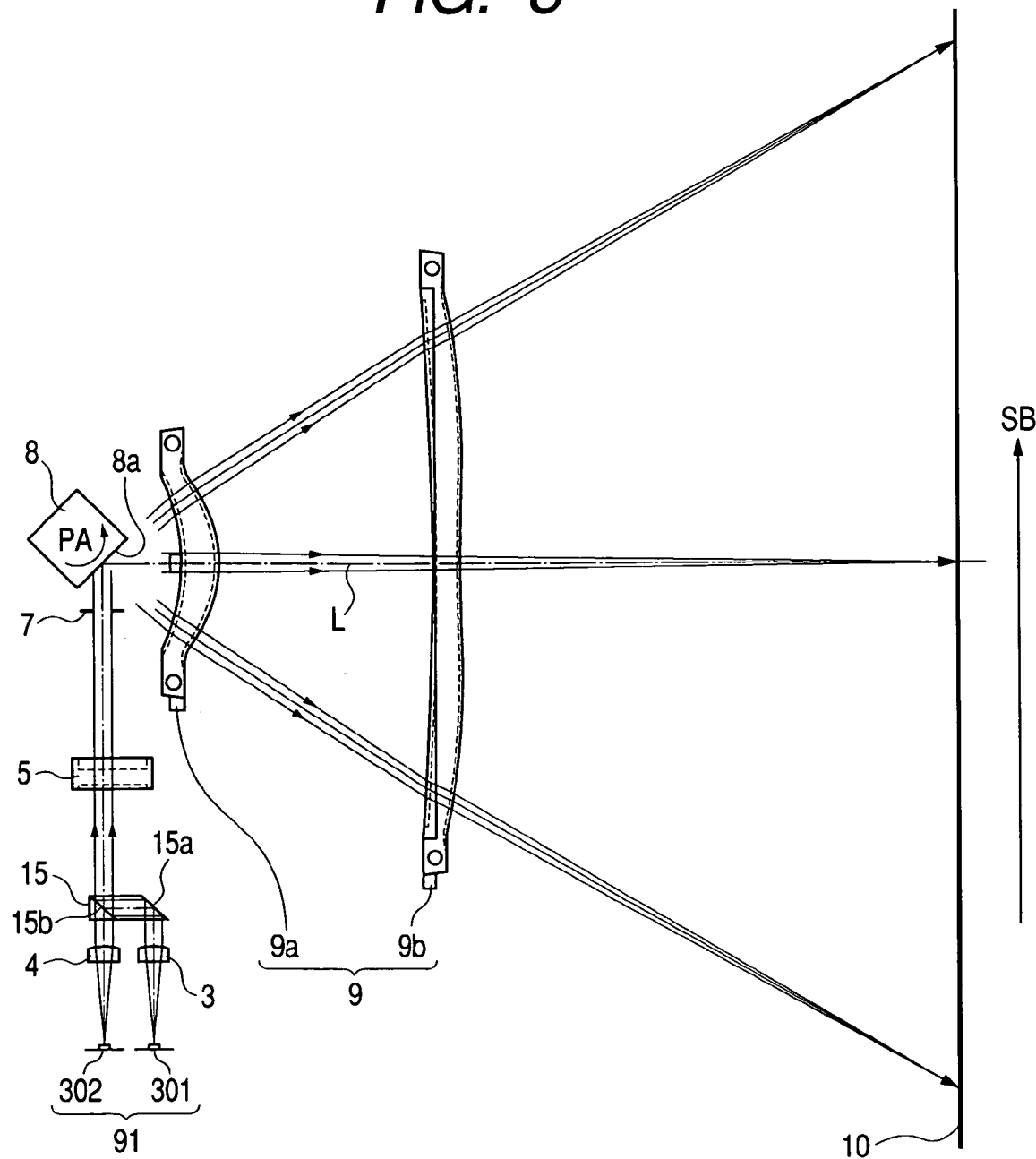
FIG. 8 is a main-scanning sectional view according to Embodiment 5 of the present invention.

FIG. 8 is a main part sectional view (main scanning sectional view) showing a multi-beam scanning optical system in the main scanning direction, according to Embodiment 5 of the present invention. In FIG. 8, the same references are provided to the same elements as shown in FIG. 1. In FIG. 8, reference numeral 91 denotes a light source unit, which includes two light source units 301 and 302.

In this embodiment, the light fluxes "A", "B", "C", and "D" emitted from a light source unit 301 in ascending order of distance from the optical axis of the scanning optical unit 9 are converted into parallel light fluxes by the collimator lens 3. The parallel light fluxes are totally reflected on a surface 15a in a prism 15, and then reflected on a surface 15b and composed with light fluxes "E", "F", "G", and "H" described later. Similarly, the light fluxes "E", "F", "G", and "H" emitted from a light source unit 302 are converted into parallel light fluxes by the collimator lens 4. The parallel light fluxes pass through the prism 15 and are entered into the optical deflector 8 through the cylindrical lens 5. At this time, the incident angles of the light fluxes "A" and "E" are made substantially equal to each other, the incident angles of the light fluxes "B" and "F" are made substantially equal to each other, the incident angles of the light fluxes "C" and "G" are made substantially equal to each other, and the incident angles of the light fluxes "D" and "H" are made substantially equal to each other. The scanning lines are arranged in the order of A1, B1, C1, D1, E1, F1, G1, and H1. The length of the scanning line formed by the light flux "A" becomes longest and the length of the scanning line formed by the light flux "H" becomes shortest.

In this embodiment, because the number of scanning lines drawn at a time is set to eight, the drum oblique incident jitter of 19.4 μm is caused in each side. In order to correct this, in this embodiment, in the case where the wavelength of the light flux "A" is used as a reference, wavelength differences, +2.3 nm, +4.6 nm, +6.9 μm, +9.2 nm, +11.5 nm, +13.8 μm, and +16.1 μm are set to the light flux "B", the light flux "C", the light flux "D", the light flux "E", the light flux "F", the light flux "G", and the light flux "H", respectively. Thus, the drum oblique incident jitter is corrected.

As described above, according to this embodiment, the corrections are performed by using the convergent jitter so as to satisfy the above-mentioned conditional expression (1). Thus, the same effect as in Embodiment 1 is obtained.

(Image Forming Apparatus)

Figure 9:
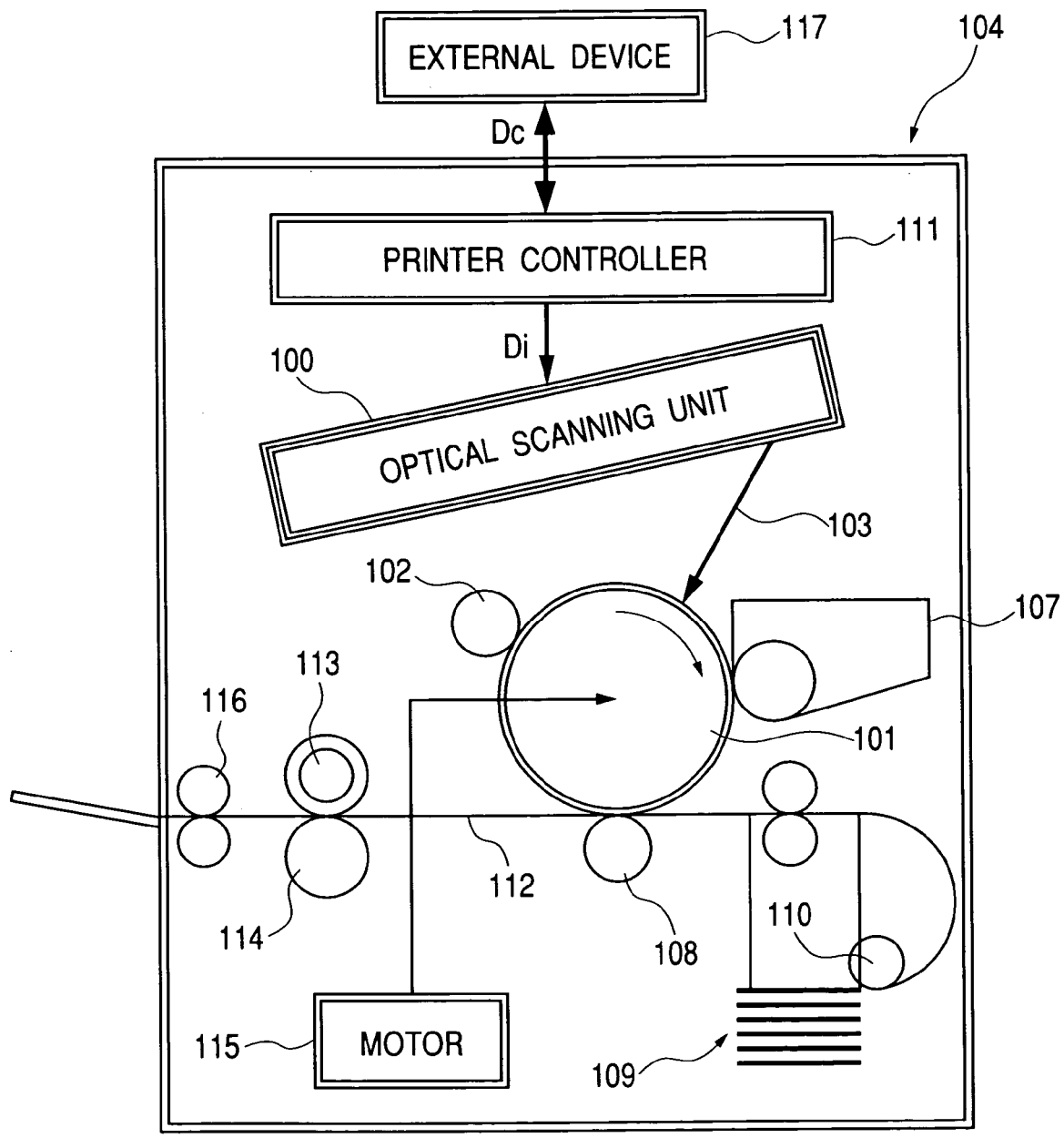
FIG. 9 is a sub-scanning sectional view showing an image forming apparatus according to an embodiment of the present invention.

FIG. 9 is a main part sectional view in the sub-scanning direction, showing an image forming apparatus according to an embodiment of the present invention. In FIG. 9, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus 104. The image data Di is inputted to an optical scanning unit (multi-beam scanning optical system) 100 having the structure described in any one of Embodiments 1 to 5. A light beam 103 modulated according to the image data Di is emitted from the optical scanning unit 100. A photosensitive surface of a photosensitive drum 101 is scanned with the light beam 103 in the main-scanning direction.

The photosensitive drum 101 serving as an electrostatic latent image bearing member (photosensitive member) is rotated clockwise by a motor 115. According to the rotation, the photosensitive surface of the photosensitive drum 101 is moved in the sub-scanning direction orthogonal to the main-scanning direction with respect to the light beam 103. A charging roller 102 for uniformly charging the surface of the photosensitive drum 101 is provided above the photosensitive drum 101 so as to come into contact with the surface thereof. The surface of the photosensitive drum 101 which is charged by the charging roller 102 is irradiated with the light beam 103 scanned by the optical scanning unit 100.

As described earlier, the light beam 103 is modulated according to the image data Di. The surface of the photosensitive drum 101 is irradiated with the light beam 103 to form an electrostatic latent image thereon. The electrostatic latent image is developed as a toner image by a developing unit 107 provided in the downstream side from the irradiation position of the light beam 103 in the rotational direction of the photosensitive drum 101 so as to come into contact with the photosensitive drum 101.

The toner image developed by the developing unit 107 is transferred onto a sheet 112 serving as a transfer material by a transfer roller 108 provided below the photosensitive drum 101 so as to oppose to the photosensitive drum 101. The sheet 112 is contained in a sheet cassette 109 located in the front (right side in FIG. 9) of the photosensitive drum 101 and also can be manually fed. A feed roller 110 is provided in the end portion of the sheet cassette 109. The sheet 112 in the sheet cassette 109 is sent to a transport path by the feed roller 110.

With the above operation, the sheet 112 to which an unfixed toner image is transferred is further transported to a fixing device located in the rear (left side in FIG. 9) of the photosensitive drum 101. The fixing device is composed of a fixing roller 113 having a fixing heater (not shown) therein and a pressure roller 114 provided in press-contact with the fixing roller 113. The sheet 112 transported from the transferring part is heated while pressurized at the press-contacting portion between the fixing roller 113 and the pressure roller 114, so that the unfixed toner image on the sheet 112 is fixed. Further, a delivery roller 116 is provided in the rear of the fixing roller 113. The sheet 112 having the image fixed thereonto is delivered to the outside of the image forming apparatus 104 by the delivery roller 116.

Although not shown in FIG. 9, the printer controller 111 performs not only the data conversion described earlier but also control of each part of the image forming apparatus 104, which is represented by the motor 115, control of a polygon motor in the optical scanning unit as described later, and the like.

(Color Image Forming Apparatus)

Figure 10:
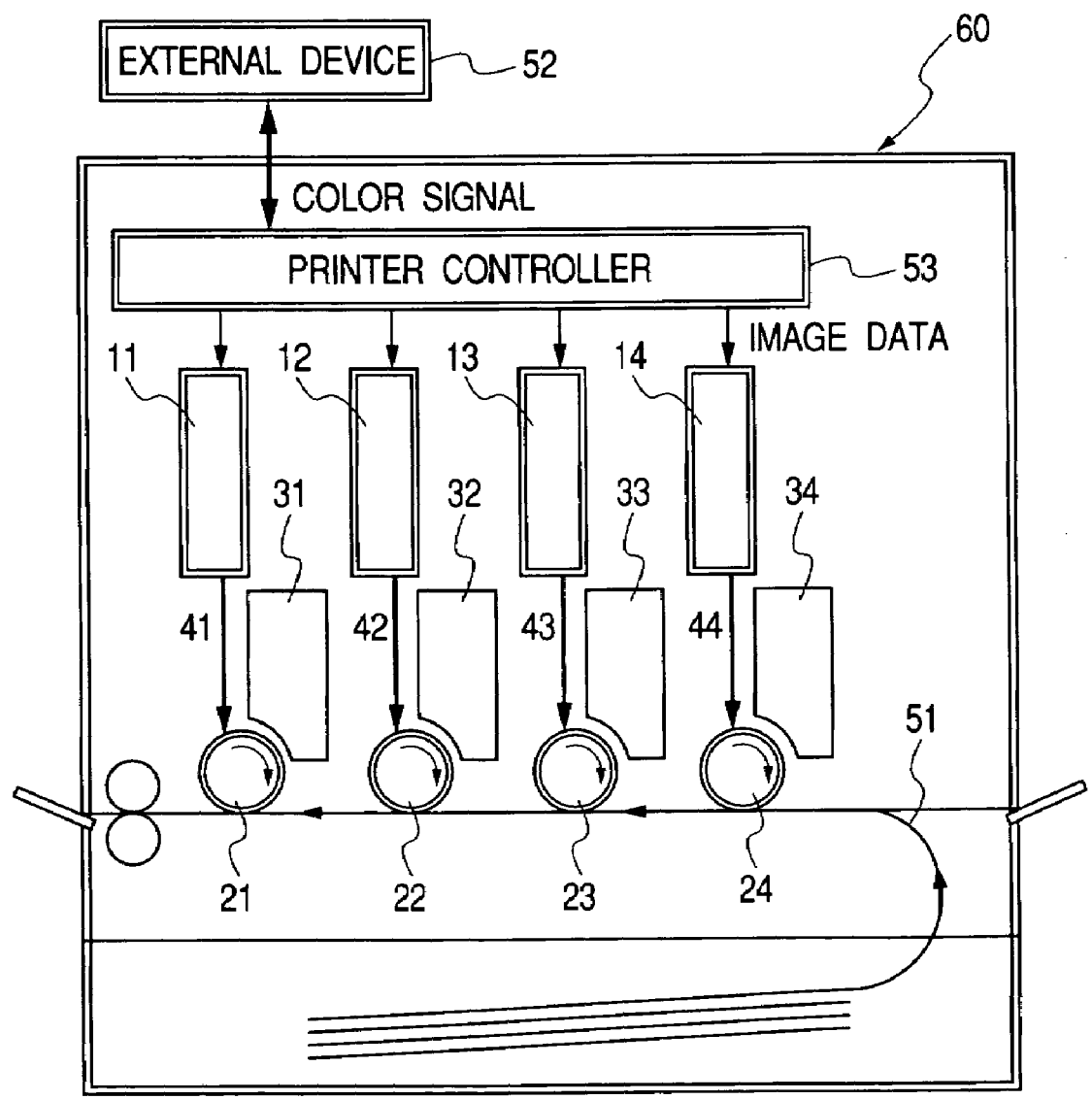
FIG. 10 is a main part schematic view showing a color image forming apparatus according to an aspect of the present invention.

FIG. 10 is a main part schematic diagram showing a color image forming apparatus according to an aspect of the present invention. This embodiment is directed to a tandem type color image forming apparatus in which four optical scanning devices are arranged to record image information in parallel on the surface of the photosensitive drum serving as the image bearing member. In FIG. 10, reference numeral 60 denotes a color image forming apparatus. Reference numerals 11, 12, 13, and 14 each denote the optical scanning device (multi-beam scanning optical system) having the structure described in any one of Embodiments 1 to 5, 21, 22, 23, and 24 each denote the photosensitive drum serving as the image bearing member. Reference numerals 31, 32, 33, and 34 each denote the developing unit, and reference numeral 51 denotes a conveyor belt.

In FIG. 10, respective color signals of R (red), G (green), and B (blue) are inputted from an external device 52 such as a personal computer to the color image forming apparatus 60. The color signals are converted into respective image data (dot data) of C (cyan), M (magenta), Y (yellow), and B (black) by a printer controller 53 in the color image forming apparatus 60. The image data is inputted to corresponding one of the optical scanning devices 11, 12, 13, and 14. A plurality of light beams 41, 42, 43, and 44 modulated according to the respective image data are emitted from the optical scanning devices 11, 12, 13, and 14. The photosensitive surfaces of the photosensitive drums 21, 22, 23, and 24 are scanned with the light beams 41, 42, 43, and 44 in the main-scanning direction.

In the color image forming apparatus according to an aspect of the present invention, the four optical scanning devices (11, 12, 13, and 14) are arranged corresponding to C (cyan), M (magenta), Y (yellow), and B (black), respectively. The image signals (image information) are recorded in parallel on the surfaces of the photosensitive drums 21, 22, 23 and 24 by the optical scanning devices to thereby print a color image at high speed.

In the color image forming apparatus according to an aspect of the present invention, as described above, the latent images of the respective colors are formed on the corresponding surfaces of the photosensitive drums 21, 22, 23, and 24 using the light beams based on the respective image data from the four scanning optical devices 11, 12, 13, and 14. After that, the later images are multiply transferred onto a recording material to produce a full color image.

For example, a color image reading apparatus including a CCD sensor may be used as the external device 52. In this case, the color image reading apparatus and the color image forming apparatus 60 compose a color digital copying machine.

Various examples and embodiments of the present invention are described. It is to be understood by a person skilled in the art that the spirit and scope of the present invention are not limited to the specific description and drawings in this specification and thus include various modifications and changes which are described in all claims in the present application.

According to the present invention, as described above, the respective elements are set so as to satisfy the conditional expression (1). Therefore, it is possible to reduce the variation in lengths of the scanning lines, which is caused when the three or more light fluxes are entered into the surface to be scanned at angles within the sub-scanning section. Thus, a multi-beam scanning optical system capable of performing high quality printing at high speed can be achieved.

What is claimed is:

1. A multi-beam scanning optical system, comprising:
   a light source having at least three light-emitting points;
   deflection means for deflecting at least three light fluxes emitted from the at least three light-emitting points to a surface to be scanned; and
   scanning optical means for guiding the at least three light fluxes which are deflected and reflected on the deflection means onto the surface to be scanned, each of the at least three light fluxes being entered into the surface to be scanned at an angle within a sub-scanning section,
   wherein, provided that a variation in lengths of scanning lines which is caused when each of the at least three light fluxes is entered into the surface to be scanned at an angle within the sub-scanning section is represented as $\Delta Y1$, a variation in lengths of scanning lines which is caused when each of the at least three light fluxes is allowed to enter as a non-parallel light flux to a deflection surface of the deflection means within a main-scanning section is represented as $\Delta Y2$, and a variation in lengths of scanning lines which is caused from a difference of wavelength between at least two of the at least three light fluxes is represented as $\Delta Y3$, values of $\Delta Y1$, $\Delta Y2$, and $\Delta Y3$ are set so as to satisfy $|\Delta Y1 + \Delta Y2 + \Delta Y3| < |\Delta Y1|$.

2. A multi-beam scanning optical system according to claim 1, wherein in the case where an optical path length of a light flux from a light-emitting point nearest an optical axis of the scanning optical means to the surface to be scanned is longer than optical paths of light fluxes from other light-emitting points to the surface to be scanned, the light fluxes which are deflected and reflected on the deflection means are converted into convergent light fluxes, and in the case where the optical path length of the light flux from the light-emitting point nearest the optical axis of the scanning optical means to the surface to be scanned is shorter than the optical paths of the light fluxes from the other light-emitting points to the surface to be scanned, the light fluxes which are deflected and reflected on the deflection means are converted into divergent light fluxes.

3. A multi-beam scanning optical system according to claim 1, wherein the light source comprises a plurality of light source units,
   at least one of the plurality of light source units includes a plurality of light-emitting points,
   a variation in lengths of scanning lines on the surface to be scanned, which are formed by light fluxes from light-emitting points in the plurality of light source units is reduced by converting the light fluxes which are deflected and reflected on the deflection means into non-parallel light fluxes within the main-scanning section, and
   a variation in lengths of scanning lines on the surface to be scanned, which are formed by light fluxes from the plurality of light-emitting points in the at least one light source unit is reduced by making a difference of wavelength between the light fluxes from the light-emitting points.

4. A multi-beam scanning optical system according to claim 1, wherein the light source comprises a plurality of light source units,
   at least one of the plurality of light source units includes a plurality of light-emitting points,
   a variation in lengths of scanning lines on the surface to be scanned, which are formed by light fluxes from light-emitting points in the plurality of light source units is reduced by making a difference of wavelength between the light fluxes from the light-emitting points in the light source units, and
   a variation in lengths of scanning lines on the surface to be scanned, which are formed by light fluxes from the plurality of light-emitting points in the at least one light source unit is reduced by converting the plurality of light fluxes which are deflected and reflected on the deflection means into non-parallel light fluxes within the main-scanning section.

5. A multi-beam scanning optical system according to claim 1, wherein the at least three light fluxes are entered into the deflection surface of the deflection means at irregular angles within the main-scanning section.

6. An image forming apparatus, comprising:
   the multi-beam scanning optical system according to any one of claims 1 to 5;
   a photosensitive member which is located on the surface to be scanned;
   a developing unit that develops, as a toner image, an electrostatic latent image which is formed on the photosensitive member scanned with the light fluxes by the multi-beam scanning optical system;
   a transferring unit that transfers the developed toner image to a transfer material; and
   a fixing device that fixes the transferred toner image to the transfer material.

7. An image forming apparatus, comprising:
   the multi-beam scanning optical system according to claim 6; and
   a printer controller that converts code data inputted from an external device into an image signal and outputs the image signal to the multi-beam scanning optical system.

8. A color image forming apparatus, comprising:
   a plurality of multi-beam scanning optical systems, each of which is the multi-beam scanning optical system according to any one of claims 1 to 5; and
   a plurality of image bearing members each located on a surface to be scanned of the multi-beam scanning optical systems, which form images of different colors.

9. A color image forming apparatus according to claim 8, further comprising a printer controller that converts a color signal inputted from an external device into image data of different colors and outputs the image data to the respective multi-beam scanning optical systems.

* * * * *